(12) United States Patent
Huff et al.

(10) Patent No.: US 10,835,940 B1
(45) Date of Patent: Nov. 17, 2020

(54) PERFLUOROALKYL SUBSTANCES (PFAS) PHYTOREMEDIATION BY MANIPULATING SOIL PROPERTIES AND PLANT MANAGEMENT

(71) Applicant: NUTTER & ASSOCIATES, INC., Athens, GA (US)

(72) Inventors: David Knox Huff, Athens, GA (US); Wade Lowry Nutter, Athens, GA (US)

(73) Assignee: Nutter & Associates, Inc., Athens, GA (US)

( * ) Notice: Subject to any disclaimer, the term of this patent is extended or adjusted under 35 U.S.C. 154(b) by 0 days.

(21) Appl. No.: 16/793,103

(22) Filed: Feb. 18, 2020

Related U.S. Application Data

(60) Provisional application No. 62/847,634, filed on May 14, 2019.

(51) Int. Cl.
*B09C 1/00* (2006.01)
*B09C 1/10* (2006.01)

(52) U.S. Cl.
CPC ................... *B09C 1/105* (2013.01)

(58) Field of Classification Search
CPC ........................................................ B09C 1/105
See application file for complete search history.

(56) References Cited

U.S. PATENT DOCUMENTS

| | | | | |
|---|---|---|---|---|
| 5,364,451 | A | * | 11/1994 | Raskin .................... B09C 1/105 210/602 |
| 2007/0101461 | A1 | * | 5/2007 | Van Der Lelie ......... A01H 3/00 800/295 |

OTHER PUBLICATIONS

Multiple Cropping—an overview | ScienceDirect Topics https://www.sciencedirect.com/topics/agricultural-and-biological-sciences/multiple-cropping (Year: 2003).*
Steinbeck, K., et al., "Short Rotation Culture of Sycamore: A Status Report," Journal of Forestry, Apr. 1972, pp. 210-213, 4 pages.
Environmental Protection Agency, "Preliminary Environmental Assessment of Biomass Conversion to Synthetic Fuels," Industrial Environmental Research Laboratory, Oct. 1978, 366 pages.
Kopp, R. F., et al, "Willow Biomass Trials in Central New York State," Biomass and Bioenergy,vol. 5, No. 2, 1993, pp. 179-187, 9 pages.
Brooks, Robert R., "Plants That Hyperaccumulate Heavy Metals," CAB International, 1998, 3 pages.

(Continued)

*Primary Examiner* — Janine M Kreck
(74) *Attorney, Agent, or Firm* — Brian S. Steinberger; Hilary F. Steinberger; Law Offices of Brian S. Steinberger, P.A.

(57) ABSTRACT

Phytoremediation processes, methods, materials and compositions to remediate soil, sediment and groundwater that is contaminated by per- and polyfluoroalkyl substances (PFAS) via phytoextraction which includes the uptake and translocation of contaminants in the contaminated media by plant roots into the above ground portions of the plants. The plants can be selected from sixteen plants as well as other plants and the invention can include managing soil salinity levels of the plants, manipulating amounts of organic matter in the contaminated site media, managing pH levels of the contaminated sites, utilizing double cropping systems, utilizing double-canopy system, and managing harvest methodology of the plants.

15 Claims, 13 Drawing Sheets

(56) References Cited

OTHER PUBLICATIONS

McCutcheon, S.C., et al., "Phytoremediation: Transformation and Control of Contaminants," Wiley Interscience, 2003, 3 pages.

Casler, M., et al., "Forage Fescues in the Northern USA," University of Wisconsin-Madison Center for Integrated Agricultural Systems, Sep. 2008, 22 pages.

Yoo, H., et al., "Quantitative Determination of Perfluorochemicals and Fluorotelomer Alcohols in Plants from Biosolid-Amended Fields Using LC/MS/MS and GC/MS," Environmental Science and Technology, vol. 45, 2011, pp. 7985-7990, 6 pages.

Zhao, H., et al., "Uptake of Perfluorooctane Sulfonate (PFOS) by Wheat (*Triticum aestivum* L.) Plant," Chemosphere vol. 91, 2013, pp. 139-144, 6 pages.

Blaine, A. C., et al., "Perfluoroalkyl Acid Uptake in Lettuce (*Lactuca saliva*) and Strawberry 2 (*Fragaria ananassa*) Irrigated with Reclaimed Water," Environmental Science and Technology, Dec. 2014, 8 pages.

Hauk, S., et al., "Economic Evaluation of Short Rotation Coppice Systems for Energy Form Biomass—A Review," Renewable and Sustainable Energy Reviews vol. 29, 2014, pp. 435-448, 14 pages.

Gobelius, L., et al, "Plant Uptake of Per- and Polyfluoroalkyl Substances at a Contaminated Fire Training Facility to Evaluate the Phytoremediation Potential of Various Plant Species," Swedish University of Agricultural Sciences, Faculty of Natural Resources and Agricultural Sciences (NJ), 2016, 74 pages.

Zhao, H., et al., "Influence of Salinity and Temperature on uptake of perfluorinated carboxylic acids (PFCAs) by hydroponically grown wheat (*Triticum aestivum* L.)," SpringerPlus, Apr. 27, 2016, 12 pages.

Navarro, I., et al., "Uptake of Perfluoroalkyl Substances and Halogenated Flame Retardants by Crop Plants Grown in Biosolids-amended Soils," Environmental Research vol. 152, 2017, pp. 199-206, 8 pages.

U.S. Environmental Protection Agency, "Technical Fact Sheet— Perfluorooctane Sulfonate (PFOS) and Perfluorooctanoic Acid (PFOA)," Nov. 2017, 8 pages.

U.S. Environmental Protection Agency, Small Business Innovative Research (SBIR) Program Grant Solicitation SOL-NC-17-00028SBIR (https://www.epa.gov/sbir/sbir-funding-opportunities), 2017, 71 pages.

Ghisi, R., et al., "Accumulation of Perfluorinated Alkyl Substances (PFAS) in Agricultural Plants: A Review," Environmental Research vol. 169, 2019, pp. 326-341, 16 pages.

U.S. Environmental Protection Agency, "EPA's Per- and Polyfluoroalkyl Substances (PFAS) Action Plan," https://www.epa.gov/sites/production/files/2019-02/documents/pfas_action_plan_021319_508compliant_1.pdf. EPA 823R18004, 2019, 72 pages.

Zhang, W., et al., "Exposure of Juncus Effusus to Seven Perfluoroalkyl Acids: Uptake, Accumulation and Phytotoxicity," Chemosphere vol. 233, 2019, pp. 300-308, 9 pages.

\* cited by examiner

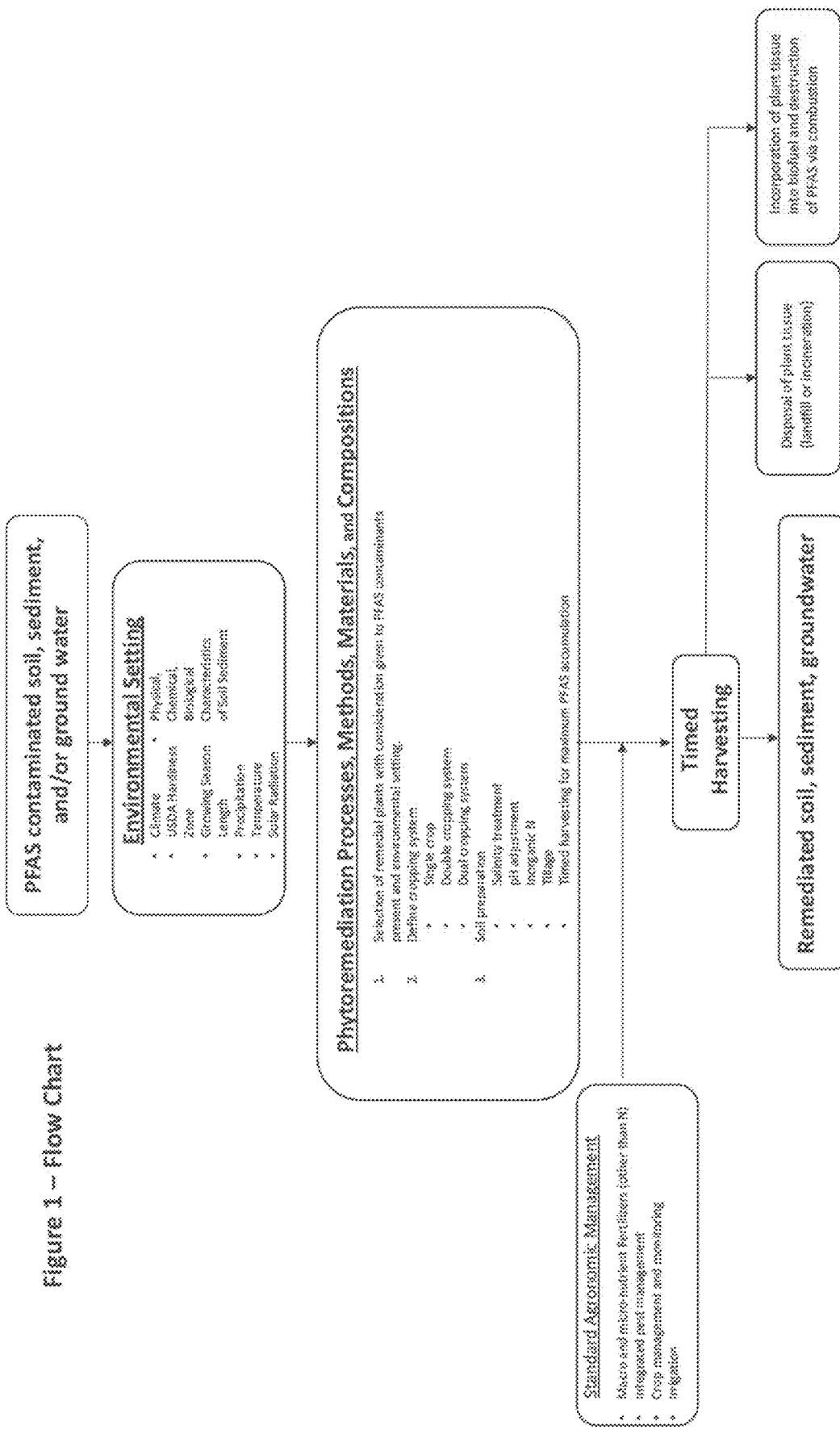
Figure 1 – Flow Chart

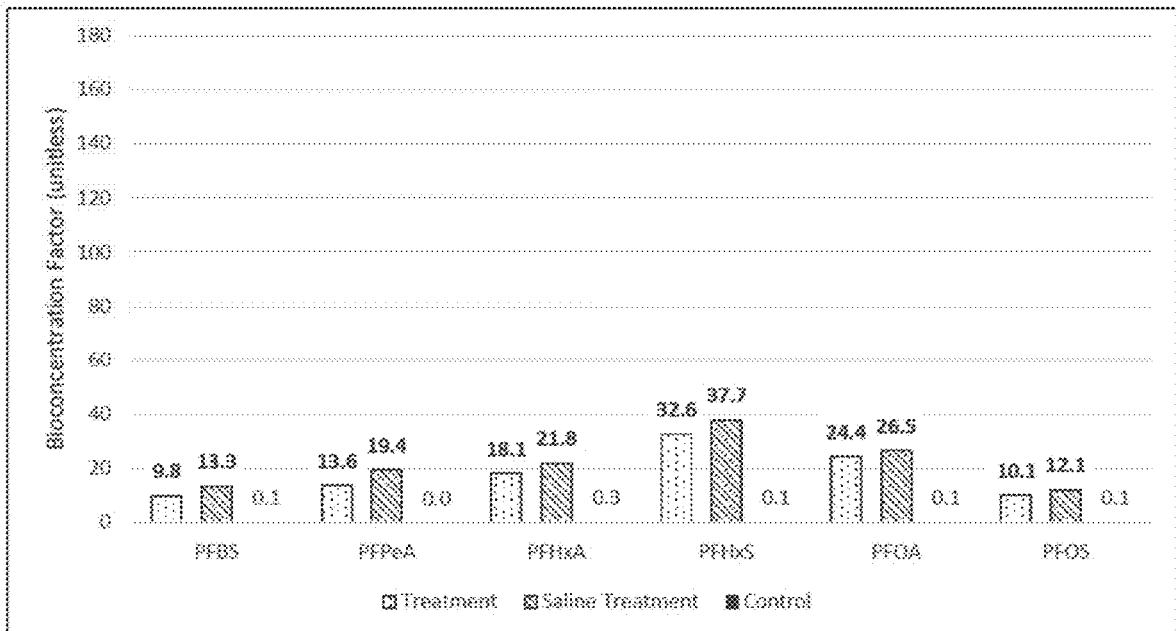
Figure 2. Bioconcentration Factors of *Festuca rubra* (red fescue) for six target PFAS compounds after 24 days of initial dosing with PFAS contaminant solution.
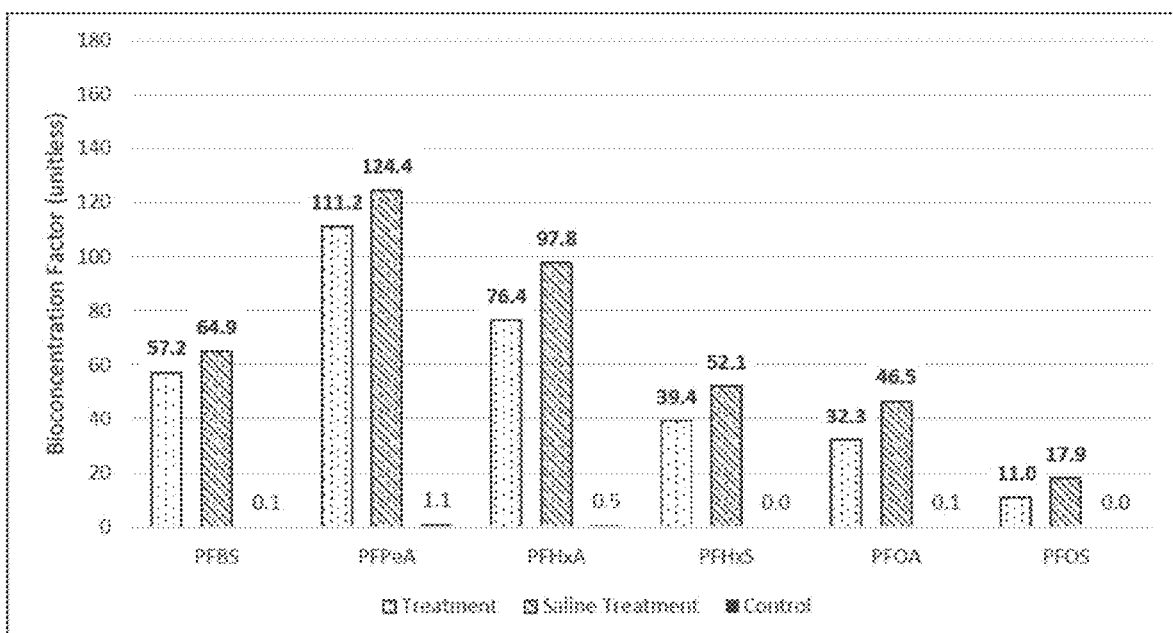
Figure 3. Bioconcentration Factors of *Festuca rubra* (red fescue) for six target PFAS compounds after 98 days of initial dosing with PFAS contaminant solution.

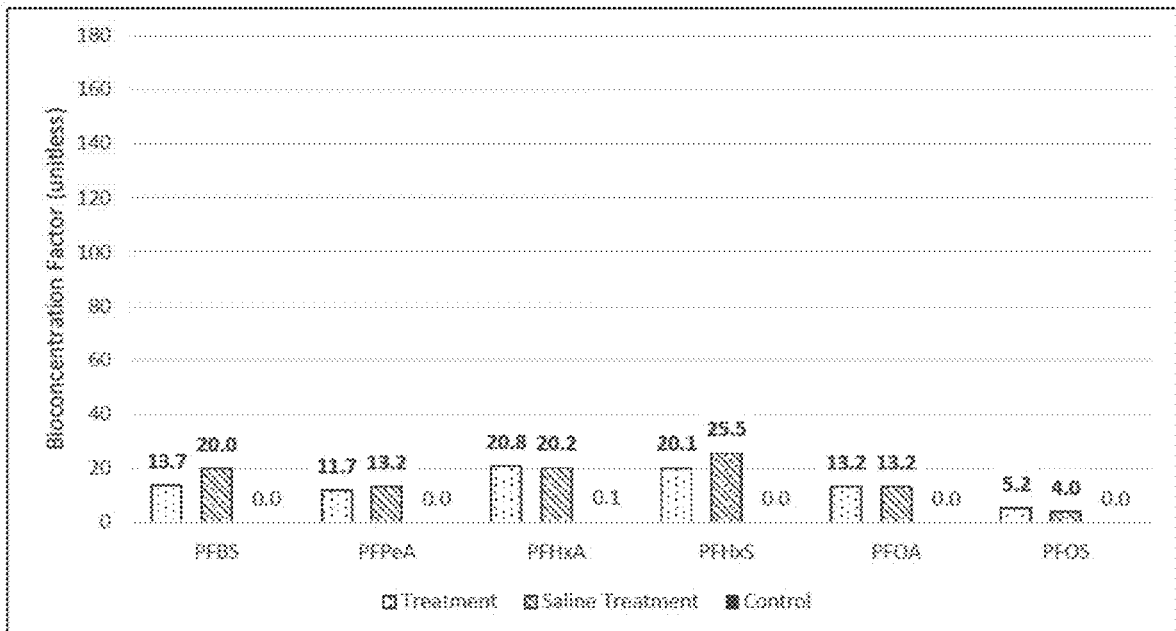
Figure 4. Bioconcentration Factors of *Cynodon dactylon* (Bermuda grass) for six target PFAS compounds after 24 days of initial dosing with PFAS contaminant solution.
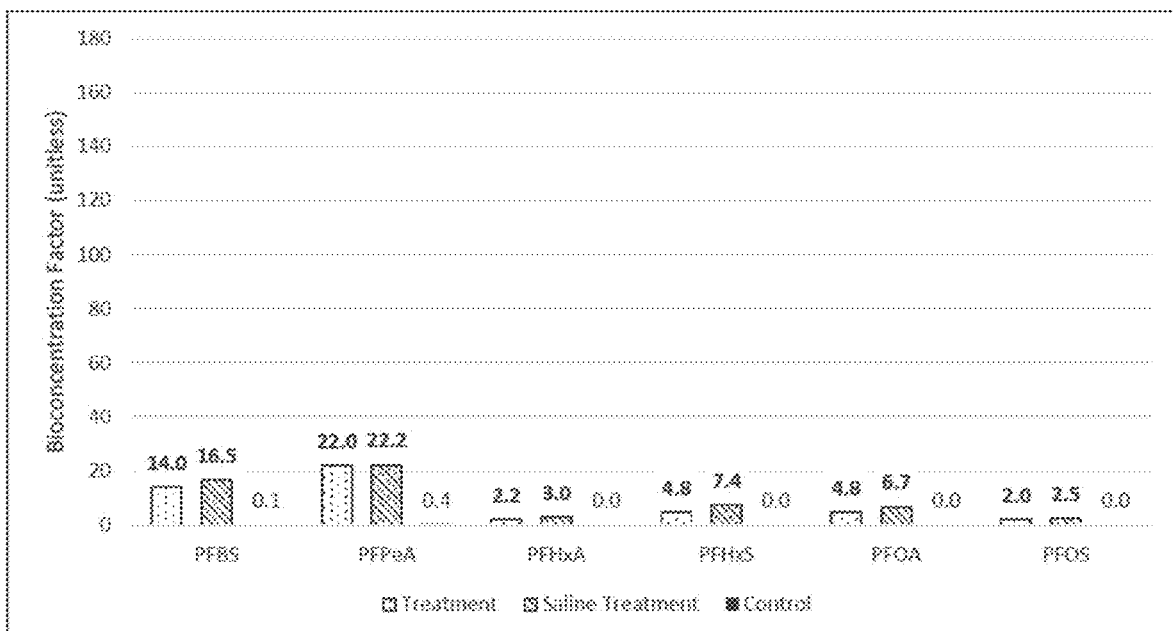
Figure 5. Bioconcentration Factors of *Cynodon dactylon* (Bermuda grass) for six target PFAS compounds after 98 days of initial dosing with PFAS contaminant solution.

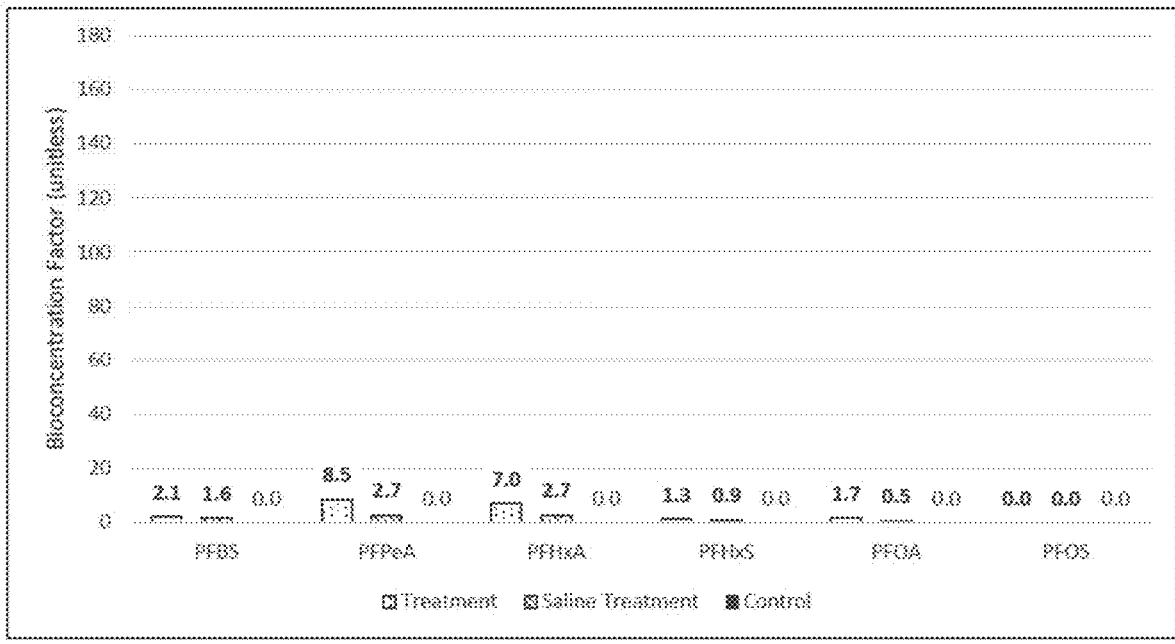
Figure 6. Bioconcentration Factors of *Liquidambar styraciflua* (sweet gum) for six target PFAS compounds after 18 days of initial dosing with PFAS contaminant solution.
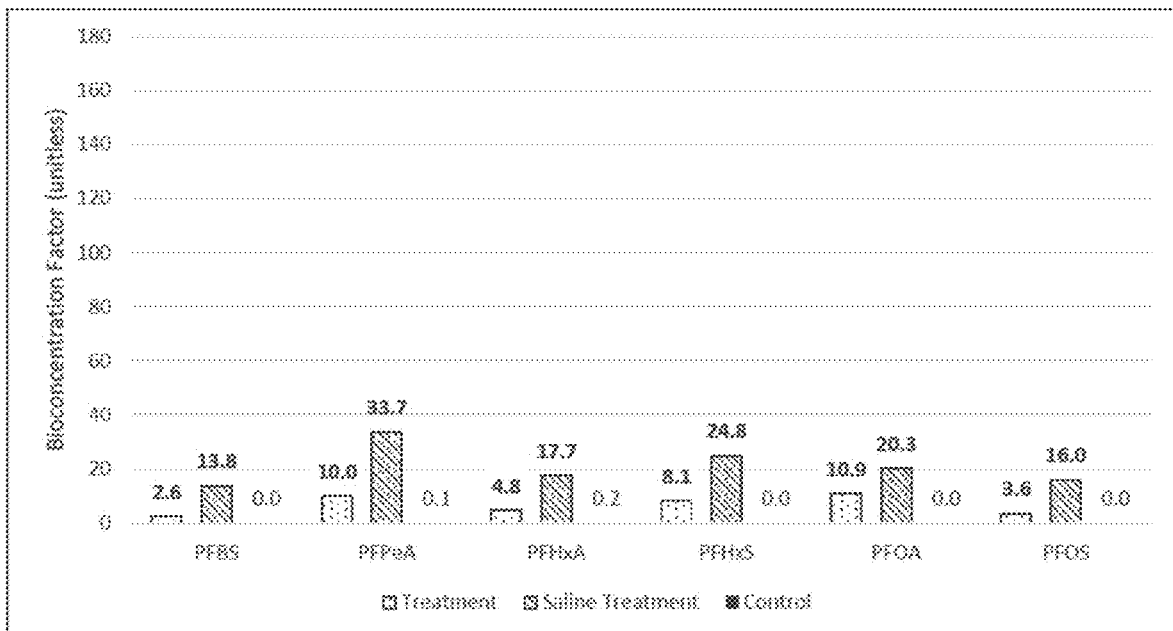
Figure 7. Bioconcentration Factors of *Liquidambar styraciflua* (sweet gum) for six target PFAS compounds after 92 days of initial dosing with PFAS contaminant solution.

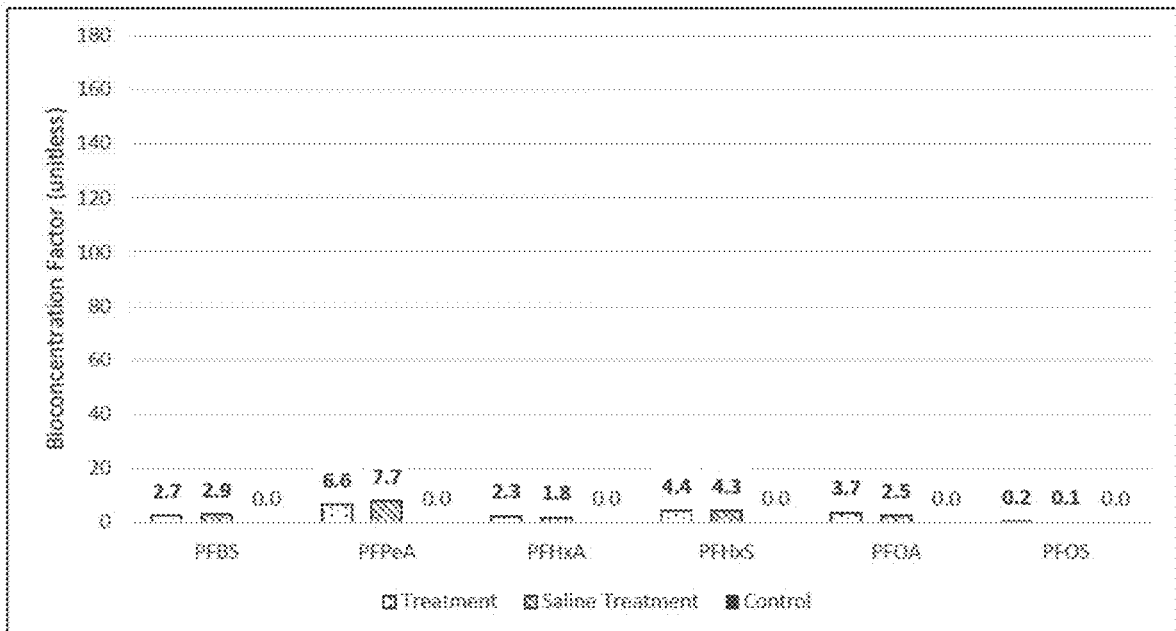
Figure 8. Bioconcentration Factors of *Salix nigra* (black willow) for six target PFAS compounds after 18 days of initial dosing with PFAS contaminant solution
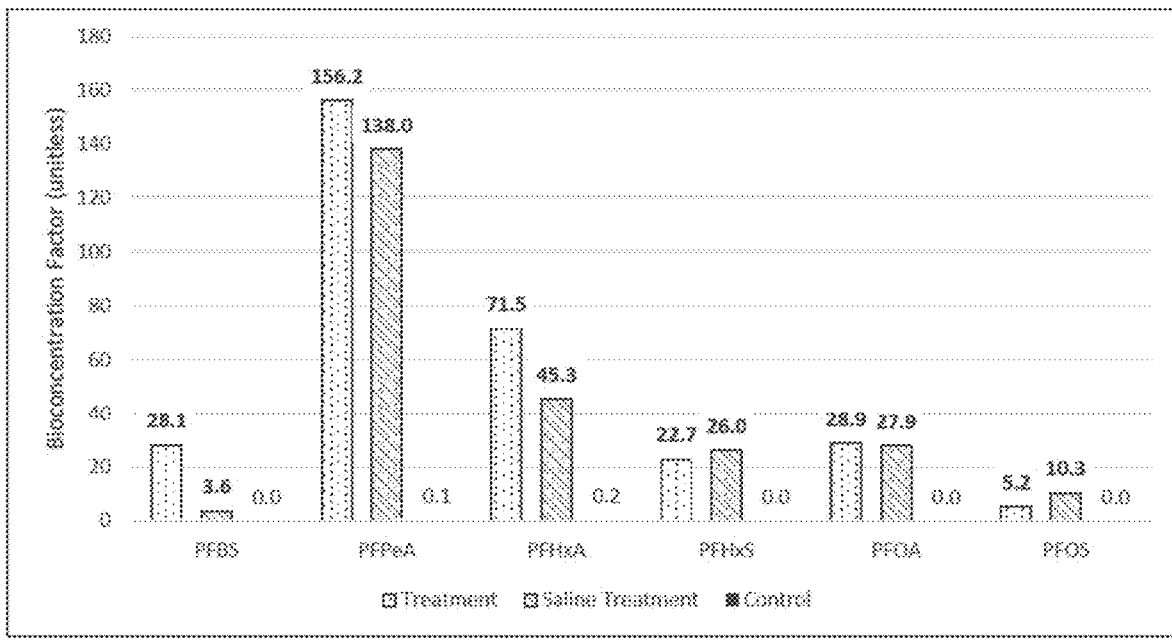
Figure 9. Bioconcentration Factors of *Salix nigra* (black willow) for six target PFAS compounds after 92 days of initial dosing with PFAS contaminant solution.

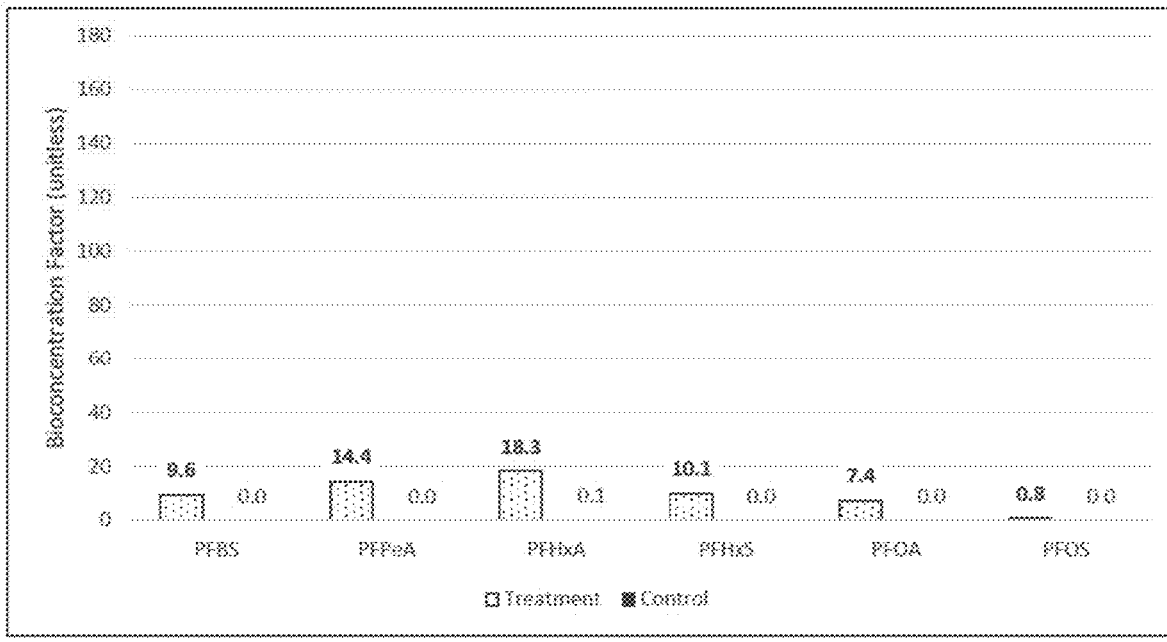
Figure 10. Bioconcentration Factors of *Trifolium incarnatum* (crimson clover) for six target PFAS compounds after 24 days of initial dosing with PFAS contaminant solution.
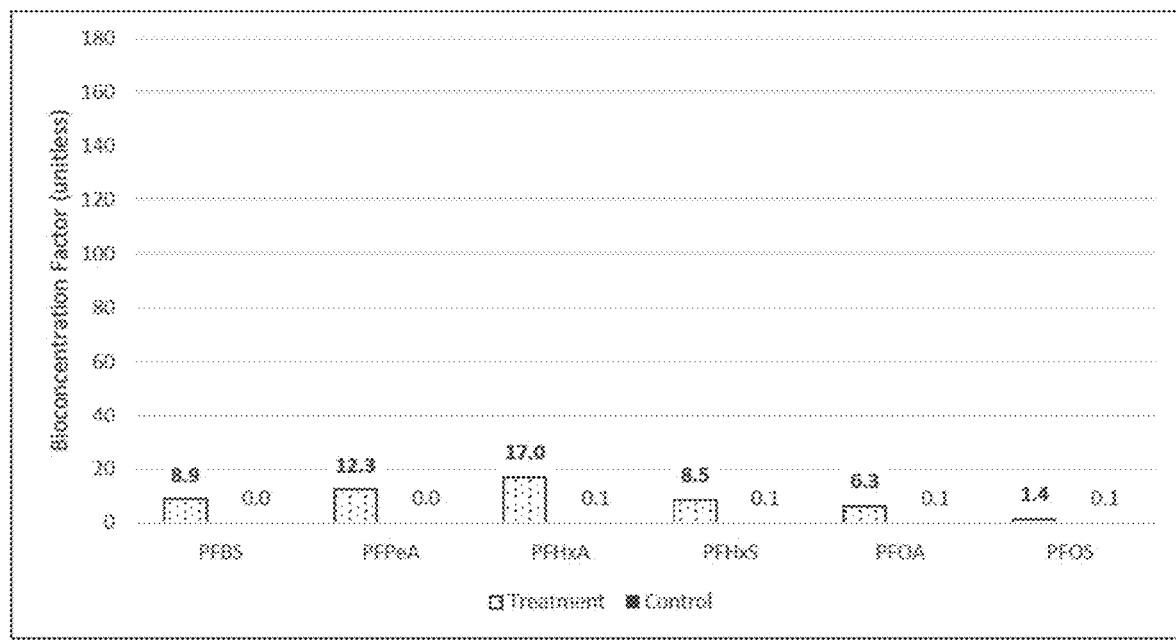
Figure 11. Bioconcentration Factors of *Schedonorus arundinaceus* (tall fescue) for six target PFAS compounds after 24 days of initial dosing with PFAS contaminant solution.

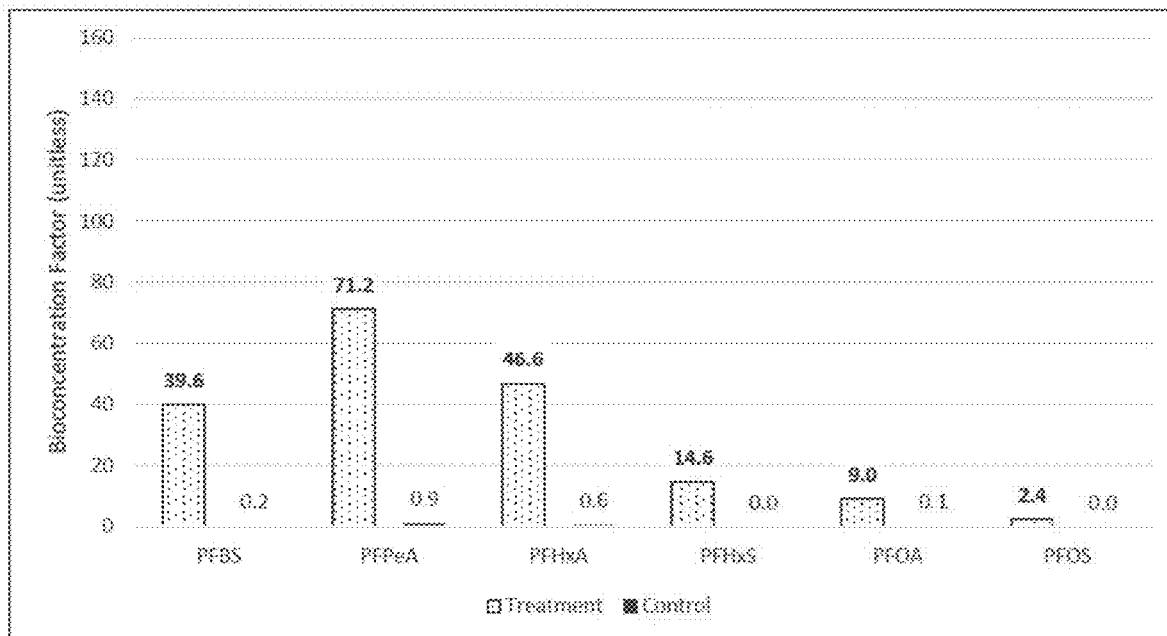
Figure 12. Bioconcentration Factors of *Schedonorus arundinaceus* (tall fescue) for six target PFAS compounds after 98 days of initial dosing with PFAS contaminant solution.
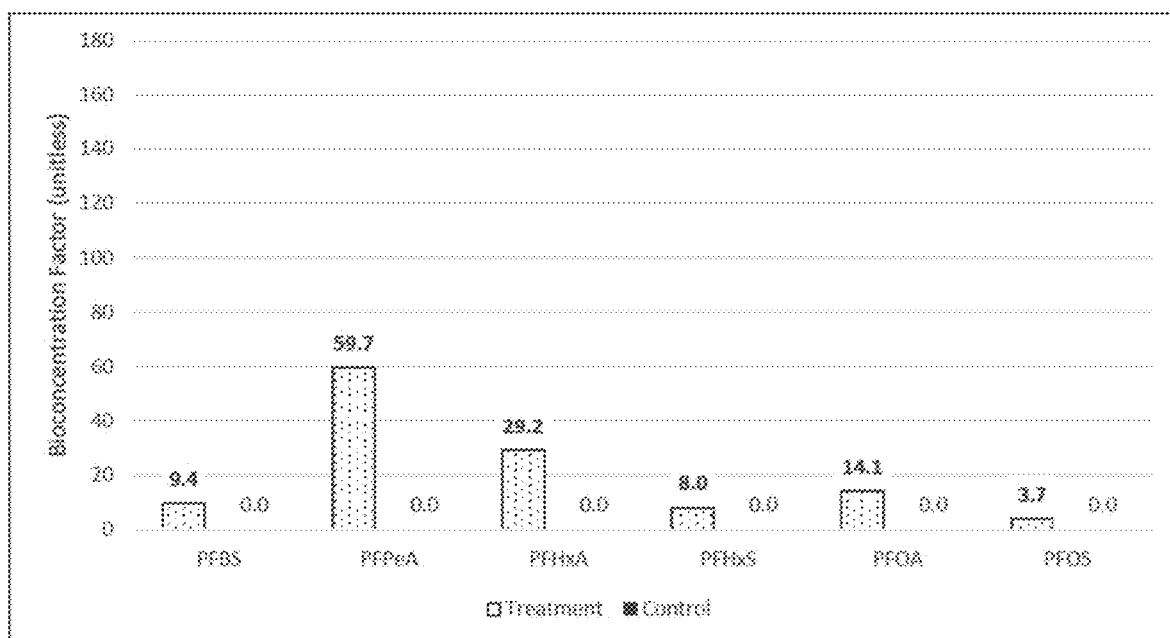
Figure 13. Bioconcentration Factors of *Brassica juncea* (Chinese mustard) for six target PFAS compounds after 24 days of initial dosing with PFAS contaminant solution.

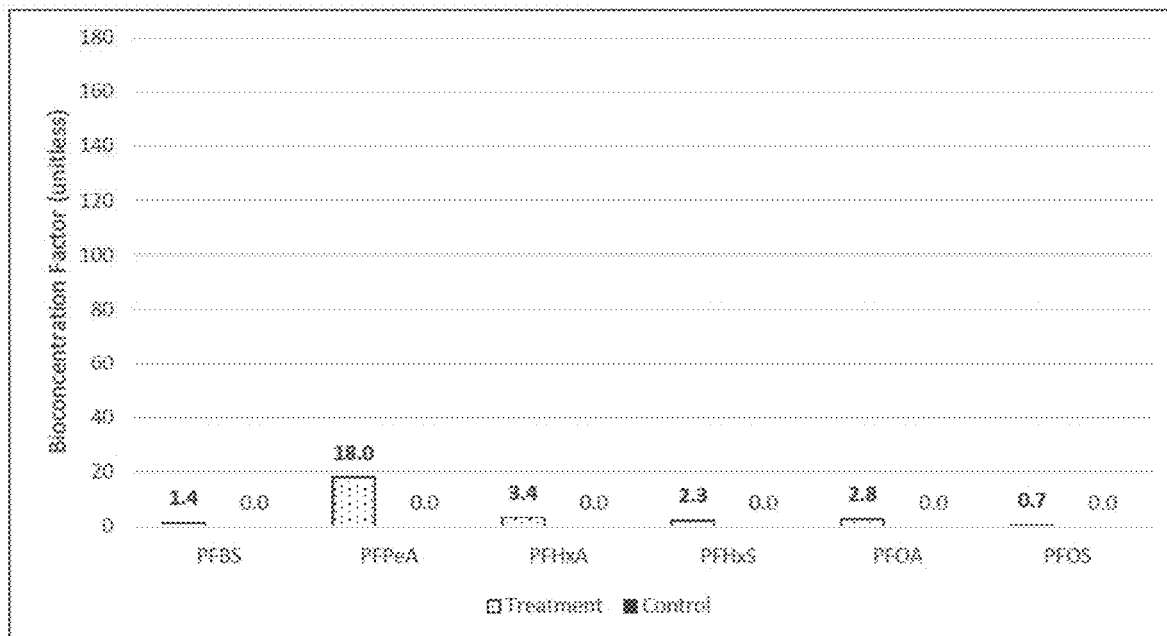
Figure 14. Bioconcentration Factors of *Helianthus annuus* (common sunflower) for six target PFAS compounds after 24 days of initial dosing with PFAS contaminant solution.
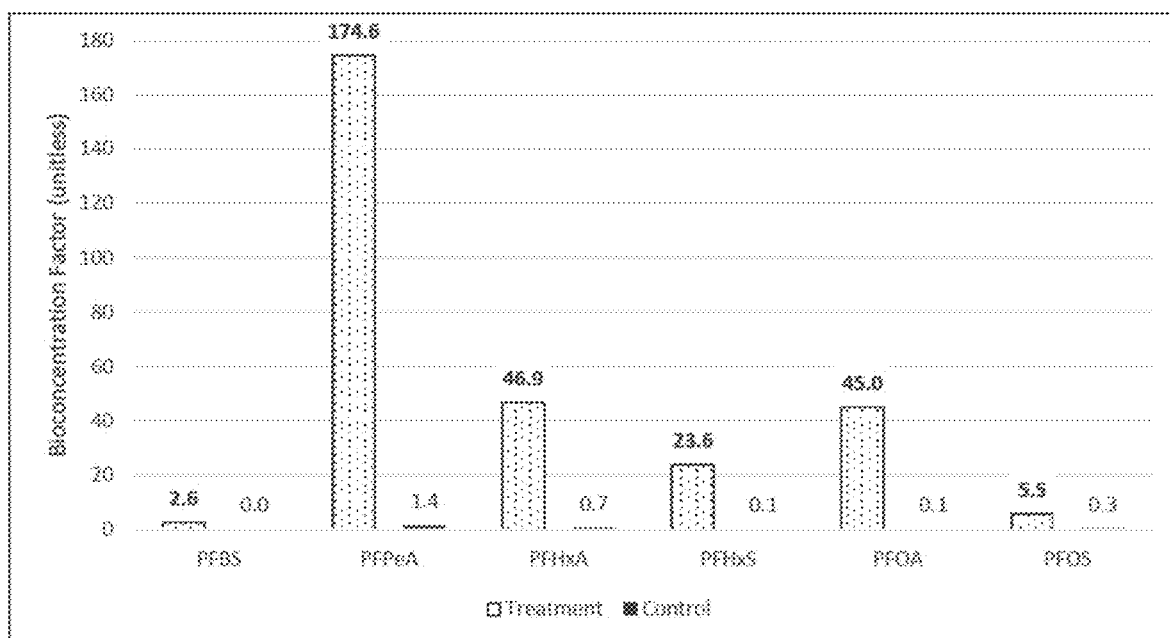
Figure 15. Bioconcentration Factors of *Amaranthus tricolor* (edible amaranth) for six target PFAS compounds after 67 days of initial dosing with PFAS contaminant solution.

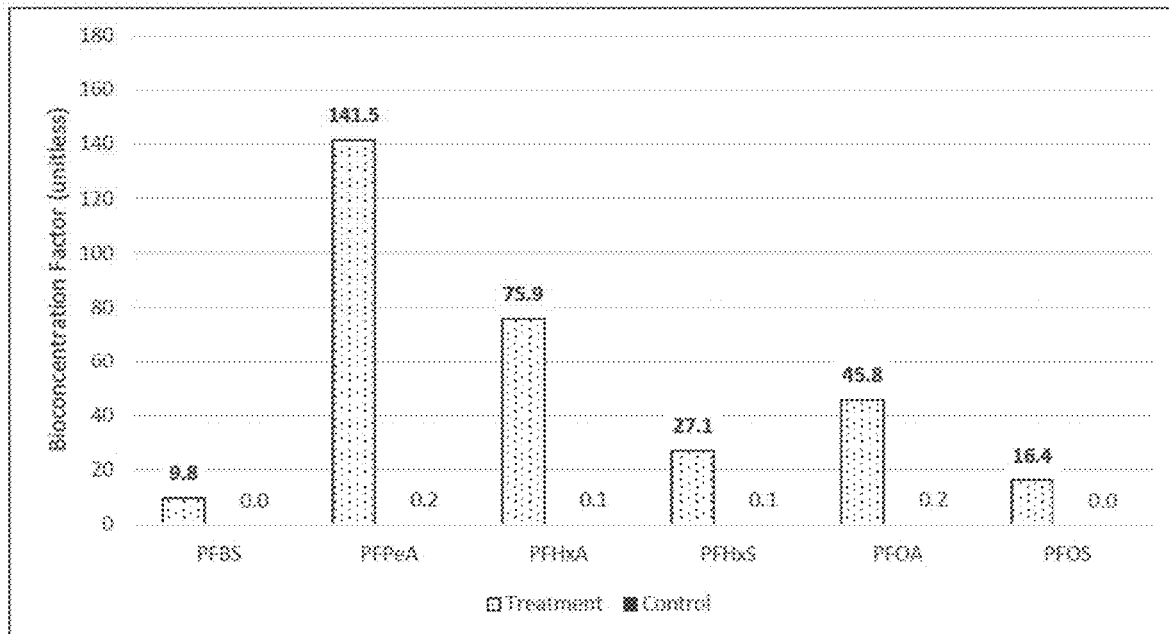
Figure 16. Bioconcentration Factors of *Betula nigra* (river birch) for six target PFAS compounds after 92 days of initial dosing with PFAS contaminant solution.
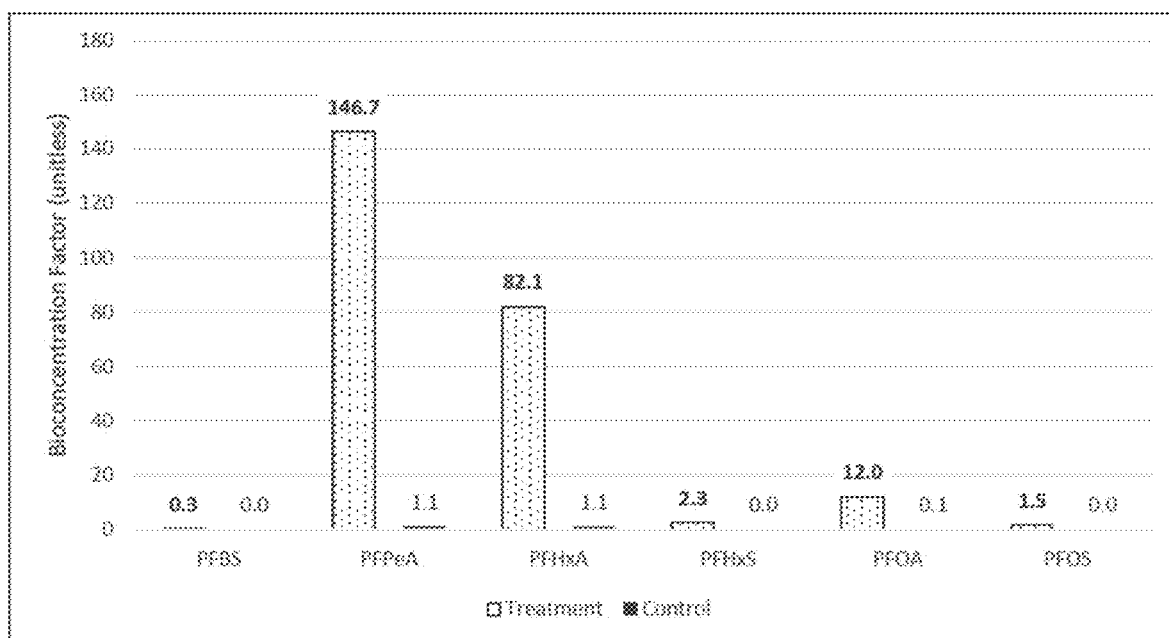
Figure 17. Bioconcentration Factors of *Esquisetum hyemale* (horsetail) for six target PFAS compounds after 92 days of initial dosing with PFAS contaminant solution.

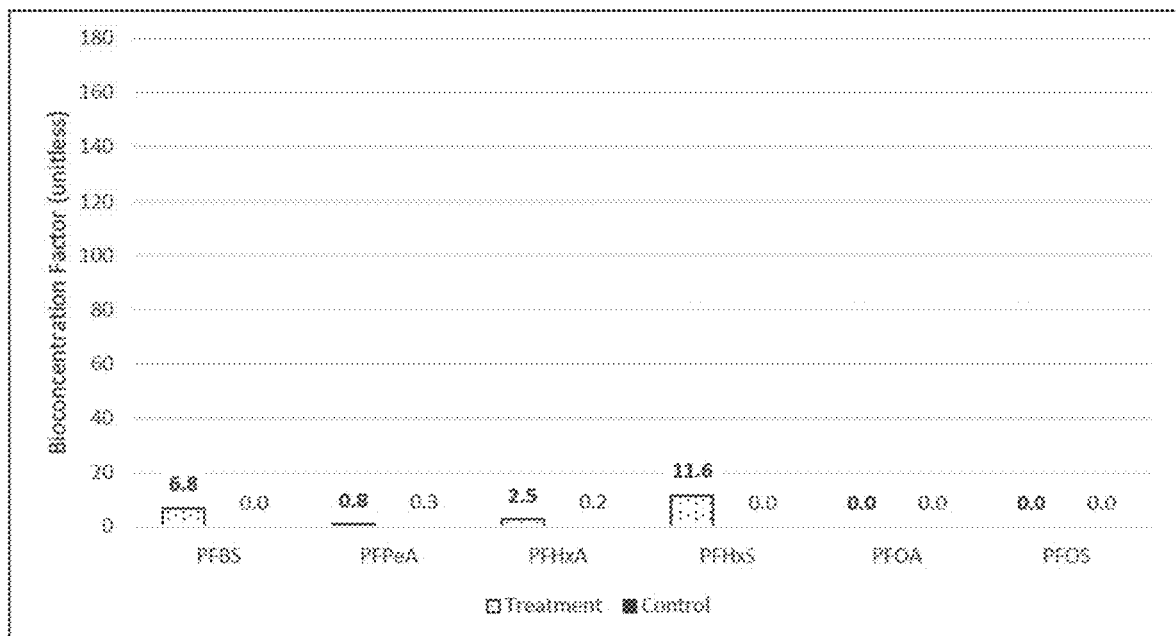
Figure 18. Bioconcentration Factors of *Fraxinus pennsylvanica* (green ash) for six target PFAS compounds after 92 days of initial dosing with PFAS contaminant solution.
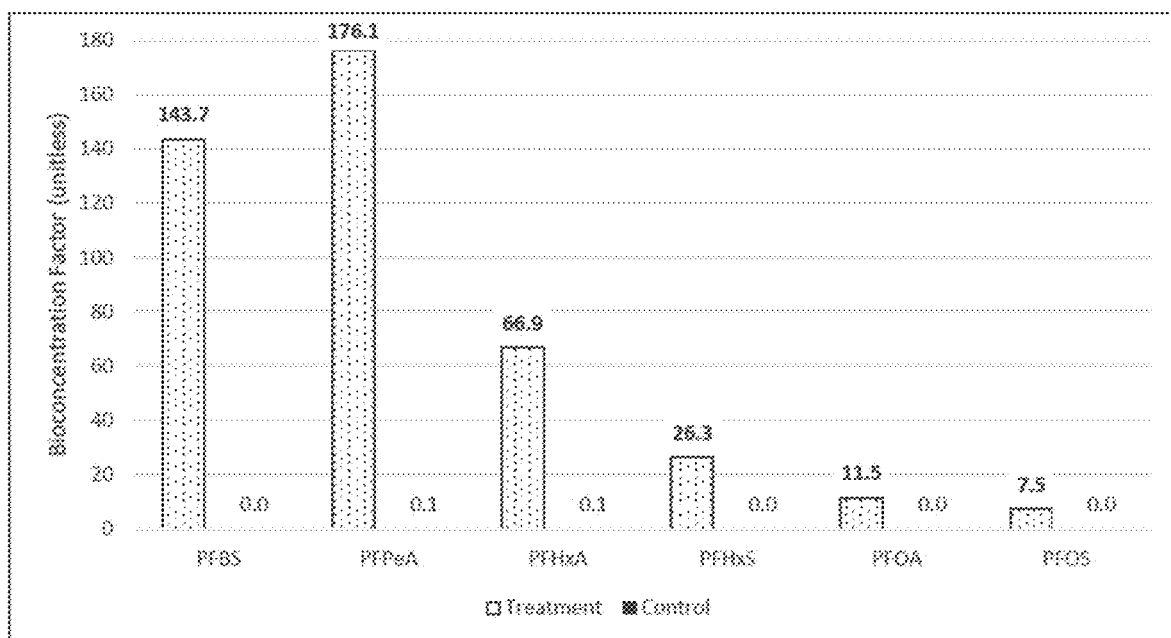
Figure 19. Bioconcentration Factors of *Liriodendron tulipifera* (tulip poplar) for six target PFAS compounds after 92 days of initial dosing with PFAS contaminant solution.

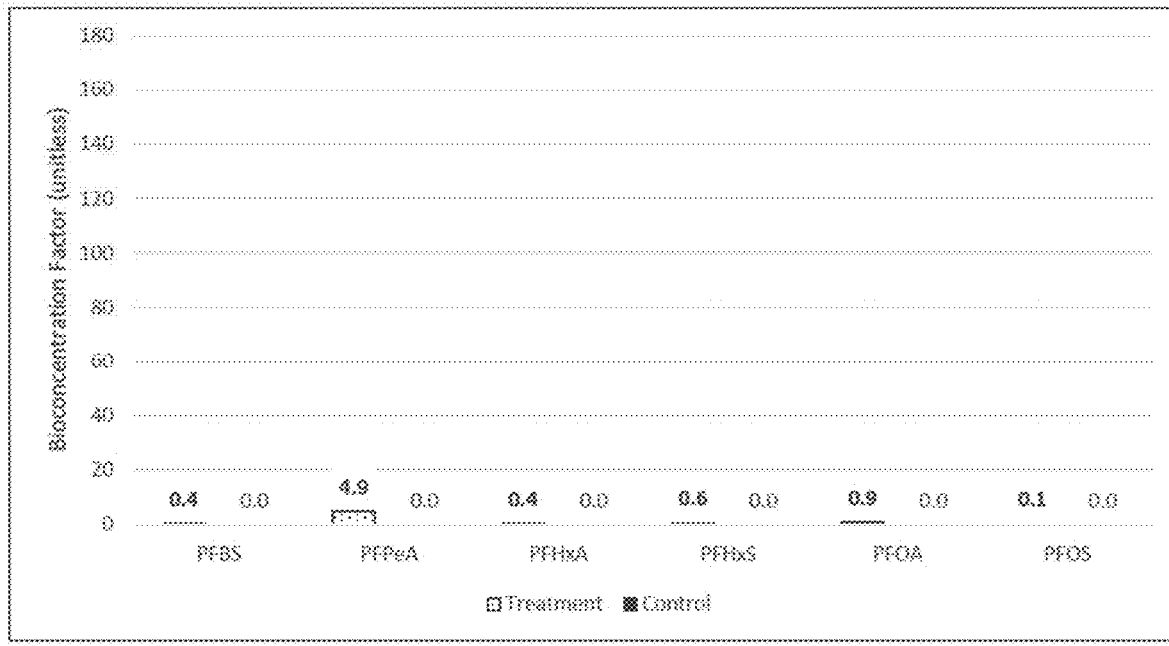
Figure 20. Bioconcentration Factors of *Pinus taeda* (loblolly pine) for six target PFAS compounds after 92 days of initial dosing with PFAS contaminant solution.
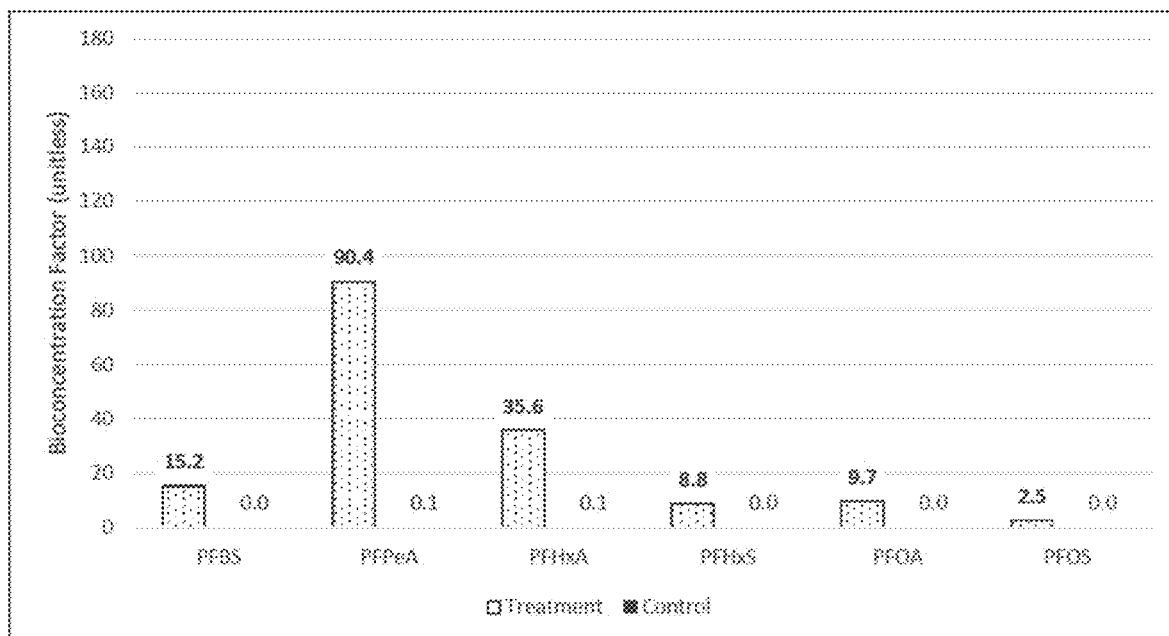
Figure 21. Bioconcentration Factors of *Platanus occidentalis* (American sycamore) for six target PFAS compounds after 92 days of initial dosing with PFAS contaminant solution.

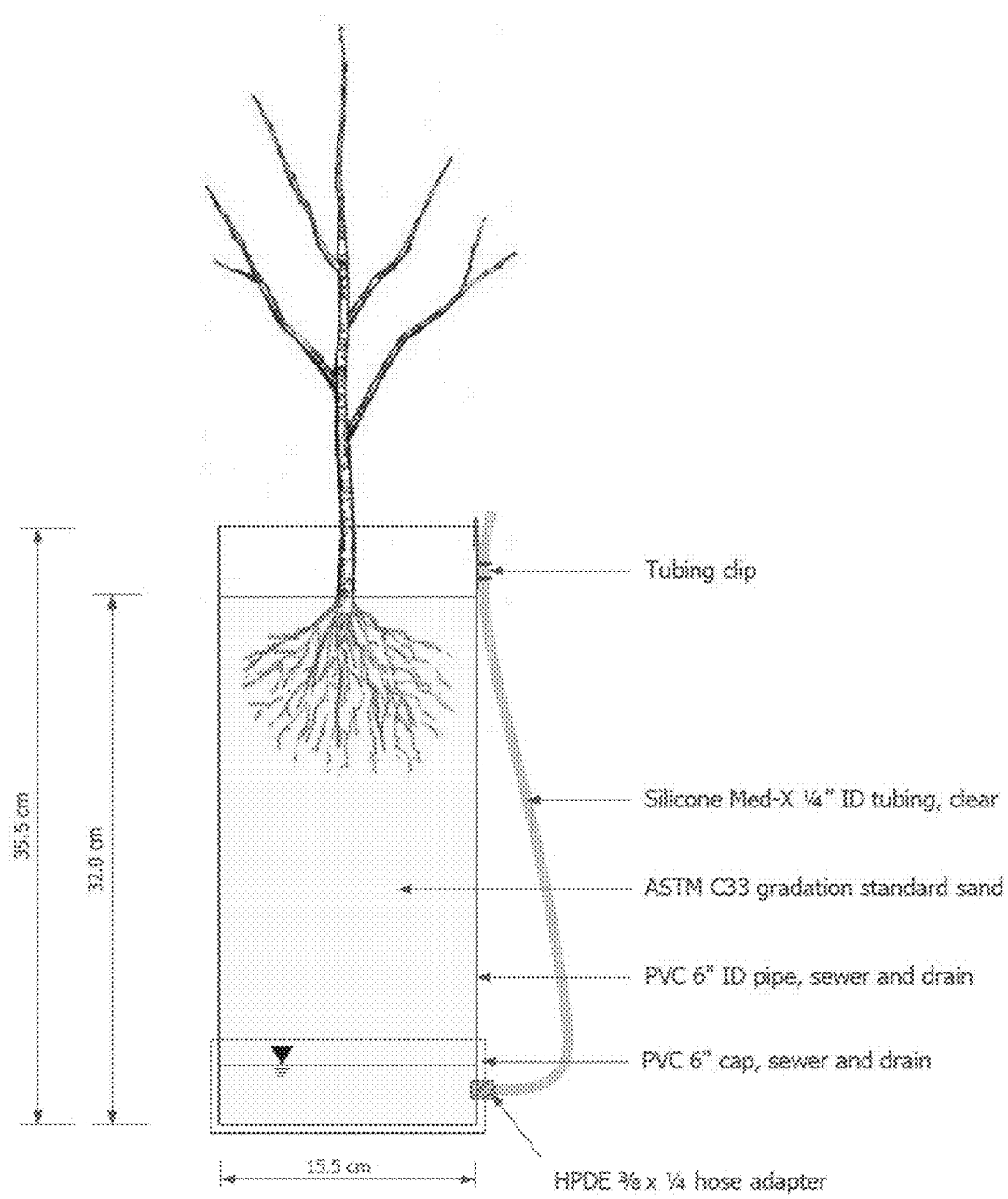
Figure 22. Schematic of a PVC growth chamber (i.e., column) used for researching and testing plant species and soil management for PFAS phytoextraction.

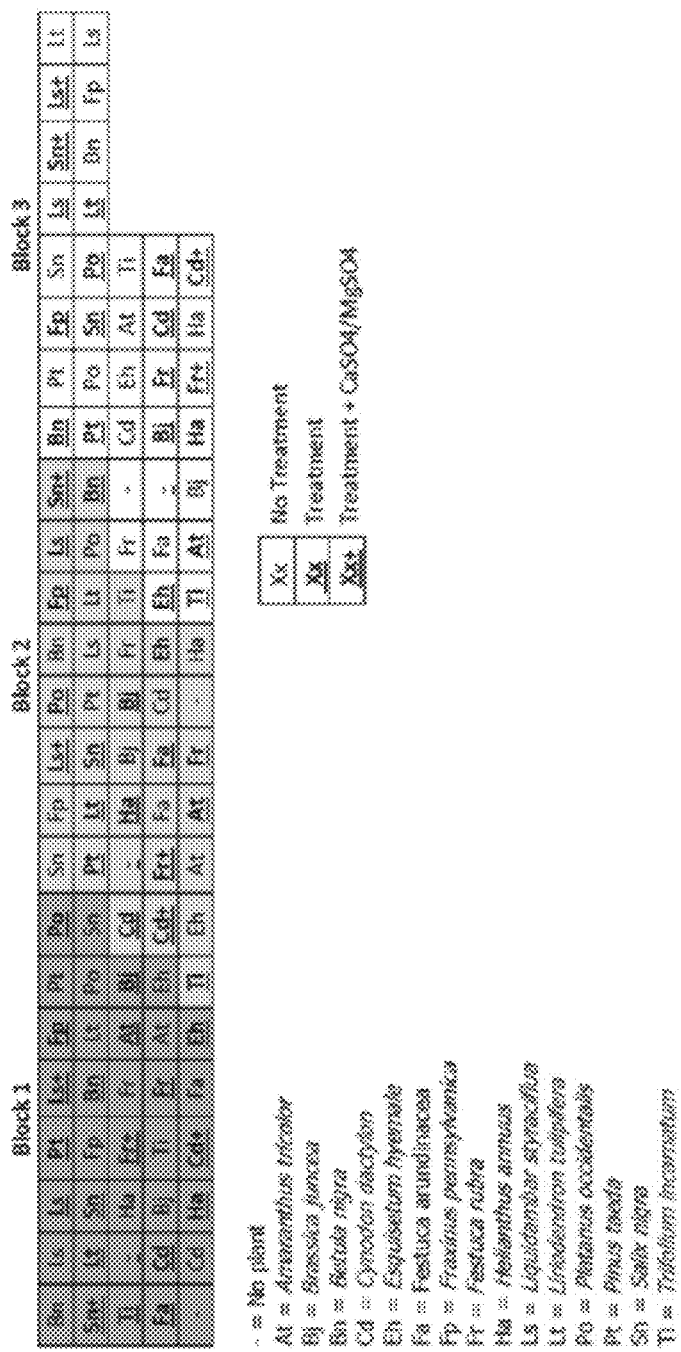
Figure 23 – Phytoremediation Study Column Layout

PERFLUOROALKYL SUBSTANCES (PFAS) PHYTOREMEDIATION BY MANIPULATING SOIL PROPERTIES AND PLANT MANAGEMENT

RELATED APPLICATIONS

This application claims the benefit of priority to U.S. Provisional Patent Application Ser. No. 62/847,634 filed May 14, 2019, which is incorporated by reference in its entirety.

FIELD OF INVENTION

This invention relates to phytoremediation, and in particular to phytoremediation processes, methods, materials and compositions to remediate soil, sediment and groundwater that is contaminated by per- and polyfluoroalkyl substances (PFAS) via phytoextraction which includes the uptake and translocation of contaminants in the soil by plant roots into the above ground portions of the plants.

BACKGROUND AND PRIOR ART

PFAS are a large group of synthetic compounds that have been broadly used to make various products more resistant to stains, grease, and water since the 1940s and there is mounting evidence that exposure above specific levels to certain PFAS leads to adverse health effects. Examples of products with which PFAS have been used extensively include nonstick cookware, stain resistant textiles, and waterproof clothing. They have also been used in many food packaging and firefighting materials. Because they help reduce friction, they are also used in a variety of other industries, including aerospace, automotive, building and construction, and electronics. PFAS are known to break down slowly in the environment and are characterized as persistent. Due to their pervasive use and persistence, there is widespread human exposure to PFAS including perfluorooctanoic acid (PFOA) and perfluorooctane sulfonate (PFOS).

There is a need for a viable and cost-effective phytoremediation cleanup methodology to address PFAS impacted soil, sediments, and groundwater. The methodology would be all the more desirable if it met core elements outlined in the American Society of Testing Materials (ASTM) E2893 Standard Guide for Greener Cleanups that include minimizing greenhouse gas emissions, air pollutants, use of materials, generation of waste, disturbance to land and ecosystems, and noise and light disturbance.

Current approaches to cleanup of impacted soil and sediment consists of expensive and energy consumptive excavation and removal.

In November 2016 the US EPA issued health advisories for PFOA and PFOS, based on the agency's assessment of the latest peer-reviewed science, to provide drinking water system operators, and state, tribal, and local officials who have the primary responsibility for overseeing these systems, with information on the health risks of these chemicals. With the issuance of these advisories greater focus has been brought to assessing the fate and potential remediation of PFAS in the environment. In February 2019, EPA issued a PFAS Action Plan to further understand and reduce PFAS risks to the public. The Action Plan describes EPA's approaches to addressing current PFAS contamination and specifically includes steps to propose designating PFOA and PFOS as "hazardous substances". In addition, the plan includes developing toxicity values for perfluorobutane sulfonic acid (PFBS) and developing guidance for cleanup actions where groundwater is contaminated with PFOA and PFOS.

Studies have indicated that PFAS accumulates in plants where it is found in the soil. However, these studies have not addressed processes, methods, materials and/or compositions to effectuate greater plant uptake for the purpose of phytoremediation.

Prospects of a phytoremediation approach for cleaning up PFAS-impacted soil and sediments were evaluated in a recent study from European researchers who found various plants species to be promising candidates for phytoremediation of PFAS (Gobelius, L., J. Lewis, and I. Ahrens, 2017. Plant Uptake of Per- and Polyfluoroalkyl Substances at a Contaminated Fire Training Facility to Evaluate the Phytoremediation Potential of Various Plant Species. Environ. Sci. Technol. 2017, 51, 12602-12610). This research consisted of a survey of plants present at a site known to be contaminated by PFAS.

Other related research has investigated the presence of PFAS in agricultural crops, largely to assess potential threats posed by PFAS in food supplies. These studies showed agricultural crop plants accumulating PFAS compounds in both root and above-ground tissue at low levels (Navarro et al 2017, Ghisi et al. 2018). The amount of accumulation depends on a variety of factors including plant species (Navarro et al. 2017, Ghisi et al. 2018), PFAS group and chain length (Blaine et al. 2014, Ghisi et al. 2018), water or soil concentration (Blaine et al. 2014, Ghisi et al. 2018), organic carbon content of the soil (Blaine et al. 2014), salinity and pH (Zhao et al. 2013). More recently, Zhang et al. (2019) reported on the uptake and accumulation of seven PFAS compounds by the wetland species Juncus effuses. They reported removal efficiencies from solution as high as 11.4% for spiked PFAS, but reported little translocation to above-ground components of the plant.

These previous studies differ from the invention presented herein because our invention focused on maximizing above-ground plant accumulation and was developed via a replicated statistically-based randomized block design study within an environmentally controlled greenhouse that produced and demonstrated repeatable results forming the basis of our phytoremediation processes, methods, materials and compositions which remediate soil, sediment, and groundwater contaminated by per- and polyfluoroalkyl substances (PFAS) via phytoextraction.

SUMMARY OF THE INVENTION

A primary objective of the present invention is to provide phytoremediation processes, methods, materials, and compositions to remediate soil that is contaminated by per- and polyfluoroalkyl substances (PFAS).

A secondary objective of the present invention is to provide phytoremediation processes, methods, materials, and compositions to remediate sediment that is contaminated by per- and polyfluoroalkyl substances (PFAS).

A third objective of the present invention it to provide phytoremediation processes, methods, materials, and compositions to remediate groundwater that is contaminated by per- and polyfluoroalkyl substances (PFAS).

A fourth objective of the present invention is to maximize phytoremediation of per- and polyfluoroalkyl substances (PFAS) at contaminated sites with selected plants by managing soil salinity levels of the plants, manipulating amounts of organic matter in the contaminated media, managing pH levels of the contaminated media, and managing harvest methodology of the plants.

A fifth objective of the present invention is to maximize phytoremediation of per- and polyfluoroalkyl substances (PFAS) at contaminated sites by utilizing coordinated double cropping systems to overlap cool season and warm season plants and utilizing coordinated dual cropping systems with shade tolerant understory forbs and grasses with tree species.

A method for increasing the amount of per- and polyfluoroalkyl substances (PFAS) that a plant will accumulate from PFAS contaminated soil, sediment, and groundwater, can include the steps of growing live selected plants in per- and polyfluoroalkyl substances (PFAS) contaminated soil, sediments, or groundwater, and providing for phytoremediation via phytoextraction of the per- and polyfluoroalkyl substances (PFAS) from the contaminated media.

The providing step further includes the steps of managing soil salinity levels, manipulating amounts of organic matter in the contaminated media, using a double-cropping system, using a double-canopy system, managing pH levels of the contaminated sites and managing harvest methodology of the plants.

The live selected plant can be selected from any one of *Amaranthus tricolor, Betula nigra, Brassica juncea, Cynodon dactylon, Esquisetum hyemale, Schedonorus arundinaceus Festuca rubra* (Red Fescue) and its subspecies, *Helianthus annuus, Liquidambar styraciflua, Liriodendron tulipifera, Trifolium incarnaturn, Platanus occidentalis*, and *Salix nigra*. The live selected plant can be *Festuca rubra* (Red Fescue) and its subspecies.

The live selected plant can be *Liquidambar styraciflua* (Sweetgum-LP).

The live selected plant can be *Salix nigra* (Black willow-LP) leaves and petioles.

The step of managing soil salinity levels of the plants can include the steps of increasing soil salinity by addition of salt, other salinity-increasing soil amendments and irrigants within the range of plant tolerances.

The step of manipulating amounts of organic matter in the contaminated sites, can include the step of reducing the amounts of organic matter and soluble carbon levels in the contaminated sites.

The step of reducing the amounts of the organic matter and soluble carbon levels in the contaminated sites, can include the steps of at least one of tilling the contaminated soil and adding inorganic nitrogen to the contaminated soil.

The step of managing pH levels of the contaminated sites can include the steps of providing soil and soil-water in the contaminated media to be circumneutral (7.0 Standard Units (+/−0.5)).

The step of managing harvest methodology of the plant, can includes the steps of providing more frequent and timed harvests of the selected plant at earlier stages of growth when protein contents are greater.

The per- and polyfluoroalkyl substances (PFAS) can include the compounds of perfluorooctanoic acid (PFOA), perfluorooctane sulfonate (PFOS), and perfluorobutane sulfonic add (PFBS).

The per- and polyfluoroalkyl substances (PFAS) can include the compounds of perfluorooctanoic acid (PFOA), perfluorooctane sulfonate (PFOS), perfluorobutane sulfonic add (PFBS), tridecafluorohexane-1-sulfonic acid potassium salt (PFHxS), perfluoropentanoic acid (PFPeA), and undecafluorohexanoic acid (PFHxA).

The providing step can include the steps of removing significant portions of compounds of per- and polyfluoroalkyl substances (PFAS) through phytoextraction and harvesting of above ground plant tissue.

The contaminated site can be selected from at least one of PFAS contaminated soil, PFAS contaminated sediment, and PFAS contaminated groundwater.

A process for hyperaccumulating multiple per- and polyfluoroalkyl substances PFAS compounds, can include the steps of growing live selected plants in per- and polyfluoroalkyl substances (PFAS) contaminated soil, sediments, or groundwater, the live plants selected from *Amaranthus tricolor, Betula nigra, Brassica juncea, Cynodon dactylon, Esquisetum hyemale, Schedonorus arundtnaceus Festuca rubra* (and its subspecies), *Helianthus annuus, Liquidambar styraciflua, Liriodendron tulipifera, Trifolium incarnatum, Platanus occidentalis*, and *Salix nigra*, and phytoremediating via phytoextraction of the per- and polyfluoroalkyl substances (PFAS) from the contaminated media, the PFAS contaminants including the compounds perfluorooctanoic acid (PFOA), perfluorooctane sulfonate (PFOS), and perfluorobutane sulfonic add (PFBS).

A process for hyperaccumulating multiple per- and polyfluoroalkyl substances PFAS compounds, can include the steps of growing live selected plants in per- and polyfluoroalkyl substances (PFAS) contaminated soil, sediments, or groundwater, the live plants selected from *Amaranthus tricolor, Betula nigra, Brassica juncea, Cynodon dactylon, Esquisetum hyemale, Schedonorus arundinaceus, Festuca rubra* (and its subspecies), *Helianthus annuus, Liquidambar styraciflua, Liriodendron tulipifera, Trifolium incarnatum*, and *Platanus occidentalis*, and *Salix nigra*, and phytoremediating via phytoextraction of the per- and polyfluoroalkyl substances (PFAS) from the contaminated media, the PFAS contaminants including the compounds perfluorooctanoic acid (PFOA), perfluorooctane sulfonate (PFOS), perfluorobutane sulfonic add (PFBS), tridecafluorohexane-1-sulfonic acid potassium salt (PFHxS), perfluoropentanoic acid (PFPeA), and undecafluorohexanoic acid (PFHxA).

Further objectives and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

FIG. 1 is a flow chart summary of the phytoremediation processes, methods, materials and compositions to remediate soil, sediment, and groundwater that is contaminated by per- and polyfluoroalkyl substances (PFAS) via phytoextraction which includes the uptake and translocation of contaminants in the soil, sediment, and groundwater by plant roots into the above ground portions of the plants.

FIG. 2 are bar graphs of the Bioconcentration Factors (BCFs) of *Festuca rubra* (Red Fescue) for six target PFAS compounds after 24 days of initial dosing with PFAS contaminant solution.

FIG. 3 are bar graphs of the BCFs of *Festuca rubra* (Red Fescue) for six target PFAS compounds after 98 days of initial dosing with PFAS contaminant solution.

FIG. 4 are bar graphs of the BCFs of *Cynodon dactylon* (Bermudagrass) for six target PFAS compounds after 24 days of initial dosing with PFAS contaminant solution.

FIG. 5 are bar graphs of the BCFs of *Cynodon dactylon* (Bermudagrass) for six target PFAS compounds after 98 days of initial dosing with PFAS contaminant solution.

FIG. 6 are bar graphs of the BCFs of *Liquidambar styraciflua* (Sweetgum) for six target PFAS compounds after 18 days of initial dosing with PFAS contaminant solution.

FIG. 7 are bar graphs of the BCFs of *Liquidambar styraciflua* (Sweetgum) for six target PFAS compounds after 92 days of initial dosing with PFAS contaminant solution.

FIG. 8 are bar graphs of the BCFs of *Salix nigra* (Black Willow) for six target PFAS compounds after 18 days of initial dosing with PFAS contaminant solution.

FIG. 9 are bar graphs of the BCFs of *Salix nigra* (Black Willow) for six target PFAS compounds after 92 days of initial dosing with PFAS contaminant solution.

FIG. 10 are bar graphs of the BCFs of *Trifolium incarnatum* (Crimson Clover) for six target PFAS compounds after 24 days of initial dosing with PFAS contaminant solution.

FIG. 11 are bar graphs of the BCFs of *Schedonorus arundinaceus* (Tall Fescue) for six target PFAS compounds after 24 days of initial dosing with PFAS contaminant solution.

FIG. 12 are bar graphs of the BCFs of *Schedonorus arundinaceus* (Tall Fescue) for six target PFAS compounds after 98 days of initial dosing with PFAS contaminant solution.

FIG. 13 are bar graphs of the BCFs of *Brassica juncea* (Mustard) for six target PFAS compounds after 24 days of initial dosing with PFAS contaminant solution.

FIG. 14 are bar graphs of the BCFs of *Helianthus annuus* (Sunflower) for six target PFAS compounds after 24 days of initial dosing with PFAS contaminant solution.

FIG. 15 are bar graphs of the BCFs of *Amaranthus tricolor* (Amaranth) for six target PFAS compounds after 67 days of initial dosing with PFAS contaminant solution.

FIG. 16 are bar graphs of the BCFs of *Betula nigra* (River Birch) for six target PFAS compounds after 92 days of initial dosing with PFAS contaminant solution.

FIG. 17 are bar graphs of the BCFs of *Esquisetum hyemale* (Horsetail) for six target PFAS compounds after 92 days of initial dosing with PFAS contaminant solution.

FIG. 18 are bar graphs of the BCFs of *Fraxinus pennsylvanica* (Green Ash) for six target PFAS compounds after 92 days of initial dosing with PFAS contaminant solution.

FIG. 19 are bar graphs of the BCFs of *Liriodendron tulipifera* (Tulip Poplar) for six target PFAS compounds after 92 days of initial dosing with PFAS contaminant solution.

FIG. 20 are bar graphs of the BCFs of *Pinus taeda* (Loblolly Pine) for six target PFAS compounds after 92 days of initial dosing with PFAS contaminant solution.

FIG. 21 are bar graphs of the BCFs of *Platanus occidentalis* (Sycamore) for six target PFAS compounds after 92 days of initial dosing with PFAS contaminant solution.

FIG. 22 is a schematic of a PVC growth chamber (i.e., column) used for researching and testing plant species and soil management for PFAS phytoextraction.

FIG. 23 is a schematic of the randomized three-block study design used in the Phytoremediation Pilot Study.

In assessing the fitness of plant species to serve in a phytoremediation role by means of phytoextraction the Bioconcentration Factor (BCF) is a key metric. The BCF is calculated as the plant/soil contaminant concentration ratio:

$$BCF_{plant} = C_{plant}/C_{reference\ media}$$

A BCF that is >1 is considered to indicate accumulation. For use in a phytoextraction context it is ideal for remedial plants to have a BCF of 10 or more. FIGS. 2 through 22 present bar graphs showing the calculated BCFs for each of six different species based on the successful bench study that established "Proof-of-Concept". These BCFs substantiate efficacy of one or more implementations in accord with the present concepts, by way of example only, not by way of limitations.

DESCRIPTION OF THE PREFERRED EMBODIMENTS

Before explaining the disclosed embodiments of the present invention in detail, it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally. In this section, some embodiments of the invention will be described more fully with reference to the accompanying drawings, in which preferred embodiments of the invention are shown.

This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Other technical advantages may become readily apparent to one of ordinary skill in the art after review of the following figures and description.

It should be understood at the outset that, although exemplary embodiments are illustrated in the figures and described below; the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

Phytoremediation is the direct use of living plants for in situ remediation of contaminated soil, sludges, sediments, and groundwater through contaminant removal, degradation, or containment. Phytoextraction, also called phytoaccumulation, refers to the uptake and translocation of contaminants in the soil by plant roots into the aboveground portions of the plants. Our study successfully achieved Proof-of-Concept for multiple plant species via a bench study investigation signaling the development of an effective phytoremediation process and methodology for the cleanup of PFAS in soil, sediment, and groundwater.

Based on our laboratory data, our Phase I SBIR phytoremediation innovation has verified hyperaccumulation of multiple PFAS compounds after 24 and 98 days of initiating contaminant dosing with the PFAS contaminant solution at multiple contaminant concentrations. Additionally, our work has shown repeatable trends across three plant species indicating soil management of salinity has shown a corresponding higher plant accumulation of PFAS.

Materials and Methods

Based on our knowledge of PFAS, vegetation growing vigorously within the wetted field areas of land treatment sites where PFAS-containing wastewater has historically been applied, and plants known to be efficient at phytoextraction of various contaminants, NAI selected the sixteen species for bench trial pilot study evaluation (Table 1).

TABLE 1

Selected Plant Species for Phase I SBIR Study.

| Scientific Name | Common Name |
|---|---|
| Amaranthus tricolor | Amaranth |
| Betula nigra | River Birch |
| Brassica juncea | Mustard |
| Cynodon dactylon | Bermudagrass |
| Esquisetum hyemale | Horsetail |
| Schedonorus arundinaceus | Tall Fescue |
| Festuca rubra | Red Fescue |
| Fraxinus pennsylvanica | Green ash |
| Helianthus annuus | Sunflower |
| Liquidambar styraciflus | Sweetgum |
| Liriodendron tulipifera | Tulip Poplar |
| Trifolium incarnatum | Crimson Clover |
| Pinus taeda | Loblolly Pine |
| Philopterids hexagonopter | Broad Beech Fern |
| Platanus occidentalis | Sycamore |
| Salix nigra | Black Willow |

Seedlings were planted in columns containing washed sand. Each column was constructed of cut polyvinylchloride (PVC) pipe that was capped at the bottom and linked by an outlet valve for collection of leachate and control of the water level within the column. The outlet valve tubing was made of clear silicone so water levels in column could be monitored via the clear tubing to assess whether fluid levels in the columns were too high or low. Washed sand meeting ASTM C33 gradation standard was used to reduce contaminant sorption. A sample of the sand was analyzed by the University of Georgia Agricultural and Environmental Services Soil, Plant, and Water Laboratory for agricultural parameters. Table 2 summarizes the soil test data.

The dimensions of the columns were such that each column was filled with approximately 6000 cubic centimeters ($cm^3$) of sand which approximately equates to approximately 9000 grams (g) at a bulk density of approximately 1.5 cubic centimeters per gram (cm3/g) (FIG. 22).

The pilot study was located in a secured greenhouse that was temperature controlled at 25±3° C. and with a relative humidity target range of 70±5%. Supplemental lighting was used to extend day length to approximately 16 hours during the autumn and winter experimental periods in an attempt to help break dormancy. Experimental units were allocated in a randomized three-block design. Blocks were physically located to distribute the treatments and replications over the greenhouse micro environmental conditions. However, block design randomization was coordinated such that the tree species and herbaceous species were randomized separately to minimize canopy interference among taller tree species versus lower growing grasses and forbs (FIG. 23).

The four plant species having the highest salt tolerance (Salix nigra, Liqudambar styraciflua, Festuca rubra, Cynodon dactylon) were also treated in separate additional experimental units utilizing a saline irrigant. The saline irrigant was comprised of a solution of approximately 2.5 grams per liter (g/L) gypsum ($CaSO_4.2H_2O$) and approximately 5 g/L of Epsom salt ($MgSO_4.2H_2O$) mixed with deionized water. This water quality had an approximate electrical conductivity of approximately 4.5 decisiemens per centimeter (dS/cm). Thus, a total number of 36 experimental units comprised each block (FIG. 23).

The contaminant dosing solution was a deionized aqueous mix containing approximately 1 milligram per liter (mg/L) of each of the following seven compounds:

1) tridecafluorohexane-1-sulfonic acid potassium salt (PFHxS)

2) heptadecafluoro-1-octanesulfonic acid (PFOS)

3) perfluorooctanoic acid (PFOA)

4) perfluoropentanoic acid (PFPeA)

5) undecafluorohexanoic acid (PFHxA)

6) nonafluoro-1-butanesulfonic acid (PFBS)

7) n-methyl perfluorooctane sulfonamide (MeFOSA)

The prepared contaminant solution was sampled using laboratory provided water sampling vials and a clean pair of nitrile gloves. The sample was shipped via overnight courier to Eurofins TestAmerica laboratory in West Sacramento, Calif. The laboratory reported concentrations (in units of nanograms per liter (ng/L) of the analytes as shown in Table 3.

TABLE 2

Agricultural soil test data for the washed sand growth media.

| pH S.U. | % Base Saturation | CEC meq/100 g | Ca | Fe | K | Mg | Mn | Na | Ni | P | Zn | Ec μS/cm |
|---|---|---|---|---|---|---|---|---|---|---|---|---|
| | | | | | Mehlich 1 mg/kg (ppm) | | | | | | | |
| 5.91 | 92.77 | 0.30 | 37.70 | 52.17 | 6.14 | 7.15 | 19.24 | 3.53 | 0.05 | 1.61 | 1.07 | 50 |

TABLE 3

PFAS concentrations of Dosing Solution as determined by laboratory analysis.

| PFAS Compound | Analyte Concentration (ng/L) |
| --- | --- |
| PFPeA | 1,600,000 |
| PFHA | 2,100,000 |
| PFOA | 940,000 |
| PFBS | 920,000 |
| PFHxS | 890,000 |
| PFOS | 850,000 |

Contaminant solution treatments were applied in approximately 100 milliliter (mL) doses to the surface of each column using a syringe such that the solution was distributed relatively even over the soil surface. Dosing was scheduled weekly. When dosing, staff removed any treated textiles or clothing that may have weather, heat, or stain resistant characteristics. In addition, dosing applications and sampling activities were performed after donning a new pair of nitrile gloves. Sampling gloves were exchanged with a new pair at any point the gloves became dirty or contact was made with materials or entities that could have been a potential cross-contaminant source.

Saline treatment plots were irrigated with approximately 100 mL increments of saline irrigation water per week or greater if water levels in the columns allowed. The columns were fertilized weekly with Hoagland complete medium solution (Plant Media Inc.) that supplied plant available N, P, K, Ca, Mg, S, B, Fe, Mn, Zn, Cu, and Mo. The Hoagland's solution was applied at an application rate of approximately 100 mL of a solution prepared as approximately 1.6 grams of Hoagland's solid media per liter of water. The solution was applied to the no-plant control plots as well.

Initial contaminant dosing and salinity dosing of the plants was to begin once the plant species exhibited healthy growth. The phytoremediation experiment was targeted to last 4 months (early November through March 2019); however, vegetation establishment was slow in many cases due to shortened photoperiod (daylength) and winter dormancy. Dosing began on the herbaceous species on Mar. 8, 2019 and the tree species were first dosed on Mar. 14, 2019. When the initial plant tissue sampling took place on Apr. 1, 2019, a total of six doses had been applied to the herbaceous species (i.e., a total of ~0.6 mg of each PFAS compound applied to each herbaceous column) and a total of five doses had been applied to the tree species (i.e., a total of ~0.5 mg of each PFAS compound applied to each tree column). The last dosing event was completed on May 8, 2109; at this time a total of twelve doses had been applied to the herbaceous species (i.e., a total of ~1.2 mg of each PFAS compound applied to each herbaceous column) and a total of eleven doses had been applied to the tree species (i.e., a total of ~1.1 mg of each PFAS compound applied to each tree column). Final plant tissue sampling was conducted June 6 through Jun. 14, 2019.

For the tree species, samples of the leaves and petioles were collected separately from woody samples of the main-stem and branches. Thus, the laboratory report for the tree species included separate results for leaves/petioles and woody material. *Trifolium incarnatum* (crimson clover) was only sampled during the initial sampling event as the plants underwent senesce prior to the final sampling. In addition, the *Fraxinus pennsylvanica* (green ash) grew poorly and only three of the six plots generated adequate plant material for collection of leaf/petiole samples.

The tissue samples were collected using clippers that were decontaminated between each sample using the following process:
1. Wiping any attached plant matter from the clippers
2. Washing the clippers in a Liquinox® and deionized water solution
3. Rising the clippers with deionized water
4. Rising the clippers with isopropyl alcohol
5. Rising the clippers again with deionized water.

The samples were containerized in plastic baggies and placed in an iced cooler. Prior to shipping the samples were re-packed on fresh ice and shipped via overnight courier with chain-of-custody documentation and a signed custody seal to the Engineering Research Center (ERC) at Brown University School of Engineering in Providence, Rode Island. With each sample shipment the samples were received in good condition the following morning at the laboratory.

The plant tissue sampling conducted on April 1 occurred only after 24 days of the first dosing event due to the initial deadline date of May 1, 2019 for responding to the Phase II grant solicitation. Hence, the sampling schedule was moved up to accommodate the 30-day laboratory analysis turn-around period. Further, the number of species sampled was limited to ensure the laboratory could process all the submitted samples within 30 days; additional samples would have potentially jeopardized receipt of the sample results in time to respond to the Phase II solicitation. The following six species were sampled:
*Salix nigra* (Black Willow)
*Cynodon dactylon* (Bermudagrass)
*Schedonorus arundinaceus* (Tall Fescue)
*Festuca rubra* (Red Fescue)
*Liquidambar styraciflua* (Sweetgum)
*Trifolium incamatum* (Crimson Clover)

Due to the plants reaching maturity (i.e., going to seed), the *Brassica juncea* (Mustard) and *Helianthus annuus* (Sunflower) were harvested on Apr. 1, 2019 and stored in a laboratory freezer. On May 14, 2019 the *Amaranthus tricolor* (Amaranth) plants had reached maturity, were harvested, and stored in the laboratory freezer. The samples stored in the laboratory freezer were shipped to the analytical laboratory along with the final plant samples in June 2019. The final plant tissue sampling was conducted June 6 through Jun. 14, 2019.

RESULTS

From the initial sampling event, a total of 46 samples were analyzed to determine the dry weight concentration of the six contaminant solution compounds: PFOA, PFOS, PFBS, PFPeA, PFHxS, and PFHxA. With the initial laboratory analyses the laboratory reported the detected presence or absence of MeFOSA; MeFOSA presence/absence was not reported with the final laboratory analyses. The sample extraction procedure utilized was based on the procedure by Yoo, et al. (Yoo, H., J. W. Washington, T. M. Jenkins, J. J. Ellington. 2011. Quantitative Determination of Perfluorochemicals and Fluorotelomer Alcohols in Plants from Biosolid-Amended Fields using LC/MS/MS and GC/MS. Environmental Science and Technology, 45, 7985-7990.). The samples were analyzed using an ultra-performance liquid chromatograph (UPLC) equipped with a micro mass spectrometer (MS/MS). The sample results are presented in sequential order in Table 4. The results are reported on a dry weight basis in units of micrograms per kilogram (µg/Kg). The results for MeFOSA are reported as either "Present" or "Absent".

TABLE 4

PFAS Concentrations in Plant Tissue

| Sample | Date | Plant | Treatment | PFPeA | PFBS | PFHxA | PFHxS (ug/kg) | PFOA | PFOS | MeFosa |
|---|---|---|---|---|---|---|---|---|---|---|
| NAI 1LP | Jun. 6, 2019 | River Birch | No Treatment | 7 | <1 | 10 | <1 | <1 | <1 | — |
| NAI 1W | Jun. 6, 2019 | River Birch | No Treatment | <1 | <1 | <1 | <1 | <1 | <1 | — |
| NAI 2 | Apr. 1, 2019 | Black Willow | Treatment + Saline | 726.2 | 203.3 | 207.8 | 284.4 | 142.7 | 9.9 | Absent |
| NAI 2LP | Jun. 6, 2019 | Black Willow | Treatment + Saline | 19166 | 260 | 5569 | 1533 | 2530 | 277 | — |
| NAI 2W | Jun. 6, 2019 | Black Willow | Treatment + Saline | 12 | <1 | 41 | 15 | 166 | 5 | — |
| NAI 3 | Apr. 1, 2019 | Crimson Clover | Treatment | 1351.8 | 479.3 | 2255.8 | 871.2 | 767.4 | 125.8 | Absent |
| NAI 4 | Apr. 1, 2019 | Tall Fescue | Treatment | 1814.2 | 608.3 | 3242.5 | 668 | 509.2 | 116.4 | Present |
| NAI 4 (100x) | Jun. 12, 2019 | Tall Fescue | Treatment | 12850 | 2698 | 9776 | 1408 | 965 | 290 | — |
| NAI 6 | Apr. 1, 2019 | Sweetgum | Control | 0.6 | <0.4 | 2.5 | 2.7 | 1.8 | <0.4 | Absent |
| NAI 6LP | Jun. 6, 2019 | Sweetgum | Control | 5 | <1 | 17 | <1 | <1 | <1 | — |
| NAI 6W | Jun. 6, 2019 | Sweetgum | Control | <1 | <1 | <1 | <1 | <1 | <1 | — |
| NAI 7LP | Jun. 6, 2019 | Tulip Poplar | Treatment | 54996 | 3798 | 29777 | 1521 | 1036 | 16 | — |
| NAI 7W | Jun. 6, 2019 | Tulip Poplar | Treatment | 3245 | 46 | 2014 | 95 | 138 | 11 | — |
| NAI 9 | Apr. 1, 2019 | Bermudagrass | Treatment | 1332.9 | 851.2 | 3054.4 | 1187.9 | 880.4 | 332.1 | Present |
| NAI 9 (10X) | Jun. 12, 2019 | Bermudagrass | Treatment | 4344 | 1663 | 4686 | 572 | 460 | 223 | — |
| NAI 10 | Apr. 1, 2019 | Bermudagrass | No Treatment | 280 | 95 | 237 | 25 | 32 | <1 | — |
| NAI 10 | Jun. 12, 2019 | Bermudagrass | No Treatment | 283.1 | 204.6 | 952.1 | 122.7 | 33.1 | <1 | Absent |
| NAI 11 | Apr. 1, 2019 | Sweetgum | Treatment | 862.2 | 80.3 | 1019.4 | 18 | 56.3 | <0.4 | Absent |
| NAI 11LP | Jun. 6, 2019 | Sweetgum | Treatment | 248 | 176 | 365 | 277 | 262 | 65 | — |
| NAI 11W | Jun. 6, 2019 | Sweetgum | Treatment | 2579 | 10 | 849 | 30 | 320 | 27 | — |
| NAI 12 | Apr. 1, 2019 | Black Willow | Treatment | 373.6 | 62.3 | 237.9 | 166 | 130.7 | 4.7 | Absent |
| NAI 12LP | Jun. 6, 2019 | Black Willow | Treatment | 33475 | 4097 | 18411 | 2749 | 3406 | 950 | — |
| NAI 12W | Jun. 6, 2019 | Black Willow | Treatment | 370 | 14 | 192 | 37 | 160 | 26 | — |
| NAI 13 | Apr. 1, 2019 | Sunflower | No Treatment | <1 | <1 | <1 | 1 | <1 | 40 | — |
| NAI 14 | Apr. 1, 2019 | Mustard | No Treatment | <1 | <1 | 1 | <1 | <1 | <1 | — |
| NAI 15 | Apr. 1, 2019 | Sunflower | No Treatment | 538 | 185 | 530 | 281 | 398 | 75 | — |
| NAI 16LP | Jun. 6, 2019 | Loblolly Pine | Treatment | 1329 | 55 | 147 | 89 | 105 | 12 | — |
| NAI 16W | Jun. 6, 2019 | Loblolly Pine | Treatment | 2 | <1 | <1 | <1 | <1 | <1 | — |
| NAI 17LP | Jun. 6, 2019 | Green Ash | No Treatment | 55 | <1 | 72 | <1 | <1 | <1 | — |
| NAI 17W | Jun. 6, 2019 | Green Ash | No Treatment | 6 | <1 | 4 | <1 | <1 | <1 | — |
| NAI 18 | Apr. 1, 2019 | Red Fescue | Treatment + Saline | 1812.5 | 975.3 | 3601 | 2412.1 | 1857.5 | 624.9 | Present |
| NAI 18 (100x) | Jun. 12, 2019 | Red Fescue | Treatment + Saline | 36796 | 13874 | 39946 | 9582 | 9554 | 2399 | — |
| NAI 19 | Apr. 1, 2019 | Crimson Clover | No Treatment | 3.7 | <0.4 | 17 | 6.5 | 1.9 | 1.5 | Absent |
| NAI 20 | Apr. 1, 2019 | Bermudagrass | Treatment + Saline | 1517.8 | 1282 | 3064.7 | 1562.5 | 811.1 | 239.4 | Present |
| NAI 20 (10x) | Jun. 12, 2019 | Bermudagrass | Treatment + Saline | 5234 | 2249 | 5410 | 867 | 767 | 267 | — |
| NAI 21 | Apr. 1, 2019 | Sweetgum | Treatment + Saline | 74 | 86 | 65.1 | 42.5 | 4.6 | <0.4 | Absent |
| NAI 21LP | Jun. 6, 2019 | Sweetgum | Treatment + Saline | 193 | 176 | 502 | 946 | 508 | 1079 | — |
| NAI 21W | Jun. 6, 2019 | Sweetgum | Treatment + Saline | 111 | 17 | 67 | 30 | 183 | 191 | — |
| NAI 22LP | Jun. 7, 2019 | River Birch | Treatment | 21688 | 908 | 16399 | 2257 | 2994 | 870 | — |
| NAI 22W | Jun. 7, 2019 | River Birch | Treatment | 1647 | 4 | 413 | 58 | 135 | 248 | — |
| NAI 23 | Apr. 1, 2019 | Red Fescue | No Treatment | 5.8 | 6.1 | 53.3 | 14.2 | 5.6 | 10.5 | Absent |
| NAI 23 | Jun. 12, 2019 | Red Fescue | No Treatment | 215 | 16 | 143 | 11 | 15 | <1 | — |
| NAI 24 | Apr. 1, 2019 | Red Fescue | Treatment | 1492 | 601.2 | 2738.7 | 2071.2 | 1667.4 | 550.4 | Present |
| NAI 24 (100x) | Jun. 13, 2019 | Red Fescue | Treatment | 18055 | 4167 | 16731 | 3472 | 3127 | 80 | — |
| NAI 25 | Apr. 1, 2019 | Tall Fescue | No Treatment | 5.5 | 1.8 | 19.3 | 4 | 4.3 | 6.4 | Absent |
| NAI 25 | Jun. 13, 2019 | Tall Fescue | No Treatment | 174 | 6 | 145 | 2 | 8 | <1 | — |
| NAI 26W | Jun. 7, 2019 | Green Ash | Treatment | 973 | 27 | 338 | 91 | 45 | 6 | — |
| NAI 27LP | Jun. 7, 2019 | Tulip Poplar | Treatment | 60 | <1 | 55 | <1 | <1 | <1 | — |
| NAI 27W | Jun. 7, 2019 | Tulip Poplar | Treatment | 19 | <1 | 4 | <1 | <1 | <1 | — |
| NAI 28 (100x) | May 14, 2019 | Amaranth | Treatment | 47118 | 253 | 6347 | 2593 | 5551 | 806 | — |
| NAI 29 | May 14, 2019 | Amaranth | No Treatment | 696 | 1 | 334 | 2 | 14 | <1 | — |
| NAI 30 (100x) | Jun. 13, 2019 | Horsetail | Treatment | 29235 | 49 | 23950 | 304 | 1693 | 114 | — |
| NAI 31LP | Jun. 7, 2019 | Loblolly Pine | No Treatment | 5 | <1 | <1 | <1 | <1 | <1 | — |
| NAI 31W | Jun. 7, 2019 | Loblolly Pine | No Treatment | <1 | <1 | <1 | <1 | <1 | <1 | — |
| NAI 32LP | Jun. 7, 2019 | Sycamore | No Treatment | 3 | <1 | 6 | <1 | <1 | <1 | — |
| NAI 32W | Jun. 7, 2019 | Sycamore | No Treatment | 1 | <1 | <1 | <1 | <1 | <1 | — |
| NAI 33 (100x) | Apr. 1, 2019 | Mustard | Treatment | 11888 | 198 | 4591 | 714 | 1413 | 344 | — |
| NAI 34 | Jun. 13, 2019 | Horsetail | No Treatment | 241 | <1 | 294 | 1 | 9 | <1 | — |
| NAI 35 | Apr. 1, 2019 | Crimson Clover | Treatment | 1825.5 | 844.2 | 2889.7 | 459.8 | 261 | 0.8 | Absent |
| NAI 36LP | Jun. 7, 2019 | Sycamore | Treatment | 26615 | 4776 | 19306 | 1774 | 1802 | 337 | — |
| NAI 36W | Jun. 7, 2019 | Sycamore | Treatment | 71 | <1 | 63 | 24 | 91 | 33 | — |
| NAI 37 | Apr. 1, 2019 | Black Willow | No Treatment | 0.8 | <0.4 | 0.6 | 0.6 | 0.7 | 0.5 | Absent |
| NAI 37LP | Jun. 7, 2019 | Black Willow | No Treatment | 126 | <1 | 70 | <1 | <1 | <1 | — |
| NAI 37W | Jun. 7, 2019 | Black Willow | No Treatment | 3 | <1 | 1 | <1 | <1 | <1 | — |
| NAI 38 | Apr. 1, 2019 | Bermudagrass | Treatment | 1177.2 | 832.7 | 2747.3 | 1168.4 | 699.5 | 208.5 | Present |
| NAI 38 (10x) | Jun. 13, 2019 | Bermudagrass | Treatment | 4731 | 1886 | 4404 | 698 | 745 | 241 | — |
| NAI 39 | Apr. 1, 2019 | Bermudagrass | Treatment + Saline | 1315.7 | 1159.9 | 2975.8 | 1328.7 | 628.9 | 159.6 | Present |
| NAI 39 (10x) | Jun. 12, 2019 | Bermudagrass | Treatment + Saline | 4914 | 2127 | 4290 | 1068 | 995 | 288 | — |
| NAI 40 | Jun. 13, 2019 | Horsetail | No Treatment | 174 | 5 | 317 | 4 | 13 | <1 | — |
| NAI 41 | Apr. 1, 2019 | Black Willow | No Treatment | 0.5 | <0.4 | <0.4 | <0.4 | 0.5 | <0.4 | Absent |
| NAI 41LP | Jun. 7, 2019 | Black Willow | No Treatment | 31 | <1 | 17 | <1 | <1 | <1 | — |
| NAI 41W | Jun. 7, 2019 | Black Willow | No Treatment | <1 | <1 | <1 | <1 | <1 | <1 | — |

TABLE 4-continued

PFAS Concentrations in Plant Tissue

| Sample | Date | Plant | Treatment | PFPeA | PFBS | PFHxA | PFHxS (ug/kg) | PFOA | PFOS | MeFosa |
|---|---|---|---|---|---|---|---|---|---|---|
| NAI 42W | Jun. 7, 2019 | Loblolly Pine | Treatment | 5 | <1 | 7 | 2 | 8 | 3 | — |
| NAI 42LP | Jun. 7, 2019 | Loblolly Pine | Treatment | 880 | 64 | 106 | 111 | 190 | 25 | — |
| NAI 44 | Apr. 1, 2019 | Red Fescue | Treatment + Saline | 1260.5 | 529.3 | 2030.9 | 1637.7 | 1136.7 | 546.1 | Present |
| NAI 44 (100x) | Jun. 13, 2019 | Red Fescue | Treatment + Saline | 17155 | 4384 | 19130 | 3816 | 3456 | 1399 | — |
| NAI 45 | May 14, 2019 | Amaranth | No Treatment | 17 | <1 | 93 | <1 | 2 | <1 | — |
| NAI 46LP | Jun. 7, 2019 | Green Ash | No Treatment | 57 | 7 | 59 | 4 | <1 | <1 | — |
| NAI 46W | Jun. 7, 2019 | Green Ash | No Treatment | 4 | <1 | 1 | <1 | <1 | <1 | — |
| NAI 47LP | Jun. 7, 2019 | Tulip Poplar | Treatment | 35075 | 28428 | 19919 | 4428 | 1743 | 1620 | — |
| NAI 47W | Jun. 7, 2019 | Tulip Poplar | Treatment | 1743 | 51 | 1529 | 58 | 51 | 44 | — |
| NAI 48 (10x) | Apr. 1, 2019 | Sunflower | Treatment | 6494 | 191 | 1963 | 330 | 395 | 90 | — |
| NAI 49 | Apr. 1, 2019 | Tall Fescue | No Treatment | 4.8 | 3 | 24.4 | 5.4 | 7.3 | 10.2 | Absent |
| NAI 49 | Jun. 13, 2019 | Tall Fescue | No Treatment | 185 | 48 | 179 | 8 | 11 | 2 | — |
| NAI 50 (100x) | May 14, 2019 | Amaranth | Treatment | 64183 | 324 | 23866 | 3185 | 7039 | 754 | — |
| NAI 51 | Apr. 1, 2019 | Sweetgum | Treatment + Saline | 263.6 | 96.5 | 217.7 | 29.4 | 7.8 | <0.4 | Absent |
| NAI 51LP | Jun. 7, 2019 | Sweetgum | Treatment + Saline | 16645 | 4355 | 11189 | 5393 | 4534 | 3840 | — |
| NAI 51W | Jun. 7, 2019 | Sweetgum | Treatment + Saline | 388 | 64 | 234 | 24 | 144 | 202 | — |
| NAI 52 | Apr. 1, 2019 | Black Willow | Treatment | 795.8 | 229.3 | 382.6 | 316 | 292.9 | 16.9 | Absent |
| NAI 52LP | Jun. 7, 2019 | Black Willow | Treatment | 25191 | 378 | 17343 | 2049 | 3877 | 413 | — |
| NAI 52W | Jun. 7, 2019 | Black Willow | Treatment | 521 | 12 | 248 | 85 | 339 | 53 | — |
| NAI 53 | Apr. 1, 2019 | Mustard | No Treatment | <1 | <1 | <1 | <1 | <1 | <1 | — |
| NAI 54 | Apr. 1, 2019 | Tall Fescue | Treatment | 1011.7 | 488.3 | 1906.4 | 377.6 | 267.5 | 61.4 | Present |
| NAI 54 (10x) | Jun. 13, 2019 | Tall Fescue | Treatment | 4971 | 2105 | 4273 | 870 | 614 | 114 | — |
| NAI 55 | Apr. 1, 2019 | Sycamore | Treatment | 1390.1 | 486 | 2105.3 | 1490.4 | 1143.7 | 432.8 | Present |
| NAI 55 (100x) | Jun. 13, 2019 | Sycamore | Treatment | 25465 | 5427 | 21402 | 5166 | 4465 | 1730 | — |
| NAI 56LP | Jun. 7, 2019 | Sycamore | Treatment | 11442 | 143 | 3212 | 296 | 431 | 46 | — |
| NAI 56W | Jun. 7, 2019 | Sycamore | Treatment | 113 | 5 | 47 | 14 | 46 | <1 | — |
| NAI 57LP | Jun. 7, 2019 | Loblolly Pine | No Treatment | 14 | <1 | <1 | <1 | <1 | <1 | — |
| NAI 57W | Jun. 7, 2019 | Loblolly Pine | No Treatment | <1 | <1 | <1 | <1 | <1 | <1 | — |
| NAI 58 (100x) | Apr. 1, 2019 | Mustard | Treatment | 20412 | 2411 | 16550 | 1783 | 2684 | 638 | — |
| NAI 59 | Apr. 1, 2019 | Bermudagrass | No Treatment | 5.1 | <0.4 | 12.6 | 1.1 | 1.4 | 1.6 | Absent |
| NAI 59 | Jun. 12, 2019 | Bermudagrass | No Treatment | 110 | 18 | 78 | <1 | 1 | <1 | — |
| NAI 61LP | Jun. 10, 2019 | River Birch | No Treatment | 5 | <1 | 17 | <1 | <1 | <1 | — |
| NAI 61W | Jun. 10, 2019 | River Birch | No Treatment | 2 | <1 | <1 | <1 | <1 | <1 | — |
| NAI 62 | Apr. 1, 2019 | Sweetgum | No Treatment | 1.1 | <0.4 | 2.6 | <0.4 | 0.4 | <0.4 | Absent |
| NAI 62LP | Jun. 7, 2019 | Sweetgum | No Treatment | 26 | <1 | 75 | <1 | <1 | <1 | — |
| NAI 62W | Jun. 7, 2019 | Sweetgum | No Treatment | <1 | <1 | <1 | <1 | <1 | <1 | — |
| NAI 63 | Jun. 13, 2019 | Red Fescue | No Treatment | 344 | 3 | 191 | 3 | 7 | <1 | — |
| NAI 63 | Apr. 1, 2019 | Red Fescue | No Treatment | 2.5 | 1.4 | 44.6 | 1.8 | 3.3 | 2.2 | Absent |
| NAI 64 (100x) | Jun. 14, 2019 | Horsetail | Treatment | 30180 | 40 | 19789 | 276 | 1263 | 190 | — |
| NAI 65 | Apr. 1, 2019 | Sunflower | No Treatment | <1 | 6 | 2 | 31 | 11 | 267 | — |
| NAI 66W | Jun. 1, 2019 | Green Ash | Treatment | 92 | 187 | 23 | 167 | 22 | 55 | — |
| NAI 67LP | Jun. 7, 2019 | Tulip Poplar | No Treatment | 11 | 7 | 12 | <1 | <1 | <1 | — |
| NAI 67W | Jun. 7, 2019 | Tulip Poplar | No Treatment | 5 | <1 | <1 | <1 | <1 | <1 | — |
| NAI 68 | Apr. 1, 2019 | Crimson Clover | No Treatment | 5 | <0.4 | 15.7 | 0.6 | 0.4 | <0.4 | Absent |
| NAI 69 (100x) | Jun. 14, 2019 | Horsetail | Treatment | 36682 | 32 | 26854 | 257 | 1644 | 203 | — |
| NAI 70 | Apr. 1, 2019 | Crimson Clover | Treatment | 1307.7 | 393.2 | 2333.5 | 413.1 | 318.3 | <0.4 | Absent |
| NAI 71 | Apr. 1, 2019 | Sweetgum | Treatment | 231.6 | 106.5 | 196.3 | 31.4 | 48.8 | <0.4 | Absent |
| NAI 71LP | Jun. 11, 2019 | Sweetgum | Treatment | 5665 | 414 | 3047 | 1977 | 3226 | 942 | — |
| NAI 71W | Jun. 11, 2019 | Sweetgum | Treatment | 97 | 6 | 53 | 55 | 336 | 132 | — |
| NAI 72LP | Jun. 11, 2019 | Sycamore | No Treatment | 11 | <1 | 30 | <1 | <1 | <1 | — |
| NAI 72W | Jun. 11, 2019 | Sycamore | No Treatment | 3 | <1 | <1 | <1 | <1 | <1 | — |
| NAI 73 | Jun. 14, 2019 | Red Fescue | No Treatment | 86 | 1 | 58 | <1 | 1 | <1 | — |
| NAI 73 | Apr. 1, 2019 | Red Fescue | No Treatment | 3.1 | 1.5 | 8.4 | 4.3 | 4.9 | 5.4 | Absent |
| NAI 74 | Apr. 1, 2019 | Tall Fescue | No Treatment | 3.9 | 1 | 13 | 1 | 2.2 | 1.4 | Absent |
| NAI 74 | Jun. 14, 2019 | Tall Fescue | No Treatment | 231 | 6 | 145 | 2 | 13 | <1 | — |
| NAI 75 (10x) | May 14, 2019 | Amaranth | Treatment | 3061 | 401 | 10089 | 2817 | 4731 | 348 | — |
| NAI 76 | Apr. 1, 2019 | Black Willow | Treatment + Saline | 696.5 | 102.4 | 229 | 160 | 123.1 | <0.4 | Absent |
| NAI 76LP | Jun. 11, 2019 | Black Willow | Treatment + Saline | 25291 | 454 | 15064 | 2264 | 2656 | 376 | — |
| NAI 76W | Jun. 11, 2019 | Black Willow | Treatment + Saline | 23 | <1 | 32 | 7 | 107 | <1 | — |
| NAI 77LP | Jun. 11, 2019 | River Birch | Treatment | 32796 | 1135 | 23620 | 3137 | 5936 | 1391 | — |
| NAI 77W | Jun. 11, 2019 | River Birch | Treatment | 274 | 4 | 156 | 17 | 159 | 30 | — |
| NAI 80 | Apr. 1, 2019 | Mustard | No Treatment | 14 | <1 | 9 | <1 | <1 | <1 | — |
| NAI 81LP | Jun. 11, 2019 | River Birch | Treatment | 31005 | 1362 | 20210 | 3704 | 7326 | 3015 | — |
| NAI 81W | Jun. 11, 2019 | River Birch | Treatment | 138 | <1 | 91 | 50 | 239 | 263 | — |
| NAI 82LP | Jun. 11, 2019 | Loblolly Pine | Treatment | 682 | 5 | 25 | 13 | 19 | <1 | — |
| NAI 82W | Jun. 11, 2019 | Loblolly Pine | Treatment | 2 | <1 | 2 | <1 | <1 | <1 | — |
| NAI 83 | Apr. 1, 2019 | Bermudagrass | No Treatment | 2.5 | <0.4 | 3.1 | 1.4 | 1.4 | 1.9 | Absent |
| NAI 83 | Jun. 13, 2019 | Bermudagrass | No Treatment | 103 | 12 | 72 | 4 | 1 | <1 | — |
| NAI 84 (10x) | Apr. 1, 2019 | Mustard | Treatment | 6789 | 944 | 3944 | 409 | 1348 | 319 | — |
| NAI 85 (10x) | Apr. 1, 2019 | Sunflower | Treatment | 4779 | 159 | 407 | 217 | 291 | 68 | — |
| NAI 86LP | Jun. 11, 2019 | Loblolly Pine | No Treatment | 7 | <1 | <1 | <1 | <1 | <1 | — |
| NAI 86W | Jun. 11, 2019 | Loblolly Pine | No Treatment | <1 | <1 | <1 | <1 | <1 | <1 | — |
| NAI 87LP | Jun. 11, 2019 | Sycamore | No Treatment | 28 | <1 | 26 | <1 | <1 | <1 | — |

TABLE 4-continued

PFAS Concentrations in Plant Tissue

| Sample | Date | Plant | Treatment | PFPeA | PFBS | PFHxA | PFHxS (ug/kg) | PFOA | PFOS | MeFosa |
|---|---|---|---|---|---|---|---|---|---|---|
| NAI 87W | Jun. 11, 2019 | Sycamore | No Treatment | 2 | <1 | <1 | <1 | <1 | <1 | — |
| NAI 88 | Jun. 14, 2019 | Horsetail | No Treatment | 297 | 3 | 307 | 3 | 17 | <1 | — |
| NAI 89 | Apr. 1, 2019 | Red Fescue | Treatment | 1121.3 | 582.2 | 2156.7 | 1791.7 | 1417.1 | 608.8 | Present |
| NAI 89 (100x) | Jun. 14, 2019 | Red Fescue | Treatment | 22127 | 9823 | 21127 | 4293 | 3618 | 1627 | — |
| NAI 90 | Apr. 1, 2019 | Red Fescue | Treatment + Saline | 2651.4 | 758.7 | 2804.6 | 2148.9 | 1597.9 | 719.8 | Present |
| NAI 90 (100x) | Jun. 14, 2019 | Red Fescue | Treatment + Saline | 19490 | 3767 | 16710 | 3703 | 3141 | 1815 | — |
| NAI 91LP | Jun. 11, 2019 | Green Ash | Treatment | 169 | 816 | 690 | 1353 | <1 | <1 | — |
| NAI 91W | Jun. 11, 2019 | Green Ash | Treatment | 73 | 14 | 26 | 4 | 1 | <1 | — |
| NAI 92 | Apr. 1, 2019 | Black Willow | Treatment | 656.7 | 136.6 | 204.6 | 197.9 | 170.8 | 5.3 | Absent |
| NAI 92LP | Jun. 11, 2019 | Black Willow | Treatment | 36271 | 5337 | 21250 | 2889 | 3043 | 306 | — |
| NAI 92W | Jun. 11, 2019 | Black Willow | Treatment | 230 | 6 | 117 | 47 | 225 | 17 | — |
| NAI 93 | May 14, 2019 | Amaranth | No Treatment | 204 | 2 | 186 | 11 | 15 | 116 | — |
| NAI 94 | Apr. 1, 2019 | Bermudagrass | Treatment | 1145.9 | 778.1 | 2736.3 | 1129.5 | 840.3 | 320.3 | Present |
| NAI 94 (10x) | Jun. 13, 2019 | Bermudagrass | Treatment | 4852 | 1467 | 4634 | 396 | 559 | 197 | — |
| NAI 95 | Apr. 1, 2019 | Sunflower | No Treatment | 24 | 2 | 11 | 7 | 8 | 52 | — |
| NAI 96LP | Jun. 11, 2019 | Black Willow | No Treatment | 43 | <1 | 33 | <1 | <1 | <1 | — |
| NAI 96W | Jun. 11, 2019 | Black Willow | No Treatment | 12 | <1 | 3 | <1 | <1 | <1 | — |
| NAI 97LP | Jun. 11, 2019 | Sycamore | Treatment | 15456 | 252 | 5163 | 834 | 1136 | 404 | — |
| NAI 97W | Jun. 11, 2019 | Sycamore | Treatment | 66 | 1 | 54 | 6 | 52 | 14 | — |
| NAI 98 | Apr. 1, 2019 | Crimson Clover | No Treatment | 2.5 | 0.6 | 7 | 0.4 | 0.6 | <0.4 | Absent |
| NAI 99 | Apr. 1, 2019 | Tall Fescue | Treatment | 1015 | 492.6 | 1777.3 | 433.8 | 367.9 | 60.6 | Present |
| NAI 99 (100x) | Jun. 14, 2019 | Tall Fescue | Treatment | 26518 | 9371 | 23988 | 2769 | 1722 | 388 | — |
| NAI 100 | Apr. 1, 2019 | Bermudagrass | Treatment + Saline | 1302.3 | 1142.2 | 2234.6 | 1545.6 | 985.6 | 263.2 | Present |
| NAI 100 (10x) | Jun. 13, 2019 | Bermudagrass | Treatment + Saline | 4804 | 1564 | 4164 | 622 | 690 | 286 | — |
| NAI 101 | Apr. 1, 2019 | Sweetgum | Treatment | 1254.4 | 142.6 | 1311.5 | 145.4 | 175.3 | <0.4 | Absent |
| NAI 101LP | Jun. 11, 2019 | Sweetgum | Treatment | 298 | 335 | 531 | 557 | 501 | 168 | — |
| NAI 101W | Jun. 11, 2019 | Sweetgum | Treatment | 268 | 6 | 147 | 37 | 406 | 56 | — |
| NAI 102LP | Jun. 11, 2019 | Tulip Poplar | Treatment | 17853 | 18407 | 4119 | 3032 | 1366 | 805 | — |
| NAI 102W | Jun. 11, 2019 | Tulip Poplar | Treatment | 189 | 8 | 233 | 15 | 22 | 31 | — |
| NAI 103LP | Jun. 12, 2019 | Black Willow | Treatment + Saline | 39416 | 544 | 15533 | 4999 | 4771 | 2670 | — |
| NAI 103W | Jun. 12, 2019 | Black Willow | Treatment + Saline | 177 | 2 | 100 | 97 | 381 | 180 | — |
| NAI 104LP | Jun. 12, 2019 | River Birch | No Treatment | 79 | 12 | 71 | 28 | 76 | 6 | — |
| NAI 104W | Jun. 12, 2019 | River Birch | No Treatment | <1 | <1 | <1 | <1 | <1 | <1 | — |
| NAI 105 | Apr. 1, 2019 | Sweetgum | Treatment + Saline | 415.7 | 65.9 | 705.1 | 70.4 | 69.9 | <0.4 | Absent |
| NAI 105LP | Jun. 12, 2019 | Sweetgum | Treatment + Saline | 4064 | 386 | 2720 | 2239 | 2372 | 359 | — |
| NAI 105W | Jun. 12, 2019 | Sweetgum | Treatment + Saline | 208 | 10 | 155 | 39 | 310 | 101 | — |
| NAI 106W | Jun. 12, 2019 | Green Ash | No Treatment | 2 | <1 | <1 | <1 | <1 | <1 | — |
| NAI 107LP | Jun. 12, 2019 | Tulip Poplar | No Treatment | 7 | <1 | 4 | <1 | <1 | <1 | — |
| NAI 107W | Jun. 12, 2019 | Tulip Poplar | No Treatment | 4 | <1 | <1 | <1 | <1 | <1 | — |
| NAI 108 | Apr. 1, 2019 | Sweetgum | No treatment | 1.1 | <0.4 | 2.6 | <0.4 | 0.7 | <0.4 | Absent |
| NAI 108LP | Jun. 12, 2019 | Sweetgum | No treatment | 15 | <1 | 50 | <1 | <1 | <1 | — |
| NAI 108W | Jun. 12, 2019 | Sweetgum | No treatment | <1 | <1 | <1 | <1 | <1 | <1 | — |

Table 5 presents the average final sampling results by species and treatment (except crimson clover, mustard, and sunflower which were all sampled only once at the initial sampling event). Of the herbaceous species, the highest average plant tissue concentrations were observed in *Festuca rubra* (Red Fescue) that received contaminant treatments with saline irrigant. An exception is for PFOA, where *Amaranthus* (Amaranth) showed the highest average concentration of PFOA. Of the tree species, the highest average plant tissue concentrations were observed in *Betula nigra*-LP (River Birch-LP), except for PFBS where *Liriodendron tulipifera*-LP (Tulip Poplar-LP) showed the highest average. Along with *Betula nigra*-LP and *Liriodendron tulipifera*-LP, *Liquidambar styraciflua*-LP (Sweetgum-LP) and *Salix nigra*-LP (Black Willow-LP) showed higher overall accumulations of PFAS compounds, though at slightly lower averages.

The *Cynodon dactylon* (Bermudagrass) control column NAI 10, was inadvertently dosed on March 22 with approximately 70 mL of contaminant solution. The data from NAI 10 was not utilized in calculating average values presented in Table 5.

TABLE 5

Average PFAS concentrations in final plant tissue samples for each species and treatment.

| Plant Type | Treatment | PFBS (µg/kg) | PFPeA (µg/kg) | PFHxA (µg/kg) | PFHxS (µg/kg) | PFOA (µg/kg) | PFOS (µg/kg) |
|---|---|---|---|---|---|---|---|
| *Liquidambar styraciflua*-LP | Control | <1 | 15.3 | 47.3 | <1 | <1 | <1 |
| | Treatment | 308.3 | 2070.3 | 1314.3 | 937.0 | 1329.7 | 391.7 |
| | Treatment + Saline | 1639.0 | 6967.3 | 4803.7 | 2859.3 | 2471.3 | 719.0 |
| *Liquidambar styraciflua*-W | Control | <1 | <1 | <1 | <1 | <1 | <1 |
| | Treatment | 7.3 | 981.3 | 349.7 | 40.7 | 354.0 | 71.7 |
| | Treatment + Saline | 30.3 | 235.7 | 152.0 | 31.0 | 212.3 | 164.7 |

TABLE 5-continued

Average PFAS concentrations in final plant tissue samples for each species and treatment.

| Plant Type | Treatment | PFBS (µg/kg) | PFPeA (µg/kg) | PFHxA (µg/kg) | PFHxS (µg/kg) | PFOA (µg/kg) | PFOS (µg/kg) |
|---|---|---|---|---|---|---|---|
| Salix nigra-LP | Control | 0.0 | 66.7 | 40.0 | <1 | <1 | <1 |
| | Treatment | 3270.7 | 31645.7 | 19001.3 | 2562.3 | 3442.0 | 556.3 |
| | Treatment + Saline | 419.3 | 27957.7 | 12055.3 | 2932.0 | 3319.0 | 1107.7 |
| Salix nigra-W | Control | <1 | 5.0 | 1.3 | <1 | <1 | <1 |
| | Treatment | 10.7 | 373.7 | 185.7 | 56.3 | 241.3 | 32.0 |
| | Treatment + Saline | 0.7 | 70.7 | 57.7 | 39.7 | 218.0 | 61.7 |
| Lifiodendron tulipifera-LP | Control | 2.3 | 26.0 | 23.7 | <1 | <1 | <1 |
| | Treatment | 16877.7 | 35974.7 | 17938.3 | 2993.7 | 1381.7 | 813.7 |
| Lifiodendron tulipifera-W | Control | 29.5 | 650.3 | 588.7 | 36.5 | 36.5 | 37.5 |
| | Treatment | 46.0 | 1084.7 | 2014.0 | 95.0 | 138.0 | 11.0 |
| Plantanus occidentalis-LP | Control | 0.0 | 14.0 | 20.7 | 0.0 | 0.0 | 0.0 |
| | Treatment | 1723.7 | 17837.7 | 9227.0 | 968.0 | 1123.0 | 262.3 |
| Plantanus occidentalis-W | Control | <1 | 2.0 | <1 | <1 | <1 | <1 |
| | Treatment | 2.0 | 83.3 | 54.7 | 14.7 | 63.0 | 15.7 |
| Pinus taeda-LP | Control | <1 | 8.7 | <1 | <1 | <1 | <1 |
| | Treatment | 41.3 | 963.7 | 92.7 | 71.0 | 104.7 | 12.3 |
| Pinus taeda-W | Control | <1 | <1 | <1 | <1 | <1 | <1 |
| | Treatment | <1 | 3.0 | 3.0 | 0.7 | 2.7 | 1.0 |
| Fraxinus pennsylvanica-LP | Control | 3.5 | 56 | 65.5 | 2.0 | <1 | <1 |
| | Treatment | 816.0 | 169.0 | 690.0 | 1353.0 | <1 | <1 |
| Fraxinus pennsylvanica-W | Control | <1 | 4.0 | 1.7 | <1 | <1 | <1 |
| | Treatment | 76.0 | 379.3 | 129.0 | 87.3 | 22.7 | 20.3 |
| Betula nigra-LP | Control | 4.0 | 30.3 | 32.7 | 9.3 | 25.3 | 2.0 |
| | Treatment | 1135.0 | 28496.3 | 20076.3 | 3032.7 | 5418.7 | 1758.7 |
| Betula nigra-W | Control | <1 | 0.7 | <1 | <1 | <1 | <1 |
| | Treatment | 2.7 | 686.3 | 220.0 | 41.7 | 177.7 | 180.3 |
| Festuca Rubra | Control | 6.7 | 215.0 | 130.7 | 4.7 | 7.7 | 0.0 |
| | Treatment | 6472.3 | 21882.3 | 19753.3 | 4310.3 | 3736.7 | 1145.7 |
| | Treatment + Saline | 7341.7 | 24480.3 | 25262.0 | 5700.3 | 5383.7 | 1871.0 |
| Cynodon Dactylon folium | Control | 15.0 | 75.0 | 1.0 | 2.0 | 1.0 | <1 |
| | Treatment + Saline | 1672.0 | 4574.7 | 588.0 | 555.3 | 588.0 | 220.3 |
| | Saline | 1980.0 | 4621.3 | 817.3 | 852.3 | 817.3 | 280.3 |
| Tri incarnatum* | Control | 3.7 | 0.6 | 13.2 | 2.5 | 1.0 | 0.5 |
| | Treatment | 1495.0 | 572.2 | 2493.0 | 581.4 | 448.9 | 42.2 |
| Schedonorus arundinaceus | Control | 20.0 | 196.7 | 156.3 | 4.0 | 10.7 | 0.7 |
| | Treatment | 4724.7 | 14779.7 | 12679.0 | 1682.3 | 1100.3 | 264.0 |
| Helianthus annus | Control | 4.0 | 24.0 | 6.5 | 13.0 | 9.5 | 119.7 |
| | Treatment | 178.3 | 3937.0 | 966.7 | 276.0 | 361.3 | 77.7 |
| Brassica juncea | Control | <1 | 4.7 | 3.0 | <1 | <1 | <1 |
| | Treatment | 1184.3 | 13029.7 | 8361.7 | 968.7 | 1815.0 | 433.7 |
| Amaranthus tricolor | Control | 1.5 | 305.7 | 204.3 | 6.5 | 10.3 | 38.7 |
| | Treatment | 326.0 | 38120.7 | 13434.0 | 2865.0 | 5773.7 | 636.0 |
| Equisetum hyemale | Control | 4.0 | 237.3 | 306.0 | 2.7 | 13.0 | 0.0 |
| | Treatment | 40.3 | 32032.3 | 23531.0 | 279.0 | 1533.3 | 169.0 |

In assessing the fitness of plant species to serve in a phytoremediation role by means of phytoextraction, the Bioconcentration Factor (BCF) is a key metric. The BCF is calculated as the plant/soil contaminant concentration ratio:

$$BCF_{plant} = C_{plant} / C_{reference\ media}$$

A BCF that is >1 is considered to indicate accumulation. However, for use in a phytoextraction context, it is ideal for remedial plants to have a BCF of 10 or more. An additional criterion of note is when a plant accumulates an amount of a substance (i.e., contaminant) that is two orders of magnitude greater accumulation than that found in plants growing in uncontaminated media. A plant meeting these criteria is considered a hyperaccumulator (McCutcheon, et al., 2003).

BCFs were calculated for each contaminant for all species. The soil PFAS concentrations were calculated based on the measured volumes of soil in the columns and the amount of contaminant solution dosed. In calculating the soil concentrations, the nominal concentrations of PFAS compounds dosed were adjusted per the dosing solution laboratory results (Table 3). FIGS. 2 through 22 present bar graphs showing the calculated BCFs for each herbaceous species and each tree species (leaf-petiole tissue samples) for each contaminant.

With respect to the higher profile PFAS compounds (PFOS, PFOA, PFBS) the following species showed BCF concentrations>10 for one or more: Festuca Rubra (Red Fescue), Betula nigra-LP (River Birch-LP), Liquidambar styraciflua-LP (Sweetgum-LP), Salix nigra-LP (Black Willow-LP), Plantanus occidentalis-LP (Sycamore-LP), Liriodendron tulipifera-LP (Tulip Poplar-LP), Amaranthus tricolor (Amaranth), Schedonorus arundinaceus (Tall Fescue), Cynodon Dactylon (Bermudagrass), Brassica juncea (Mustard), Equisetum hyemale (Horsetail). With respect to the tree species, hyperaccumulation was observed in the leaves and petioles and not in the woody mass (mainstems and branches). The BCFs for these compounds are summarized in Table 6.

TABLE 6

Species exhibiting BCFs greater than 10.

| Species | Compound | BCF Treatment | BCF Saline Treatment | BCF Control |
|---|---|---|---|---|
| River Birch - LP | PFOS | 16.4 | — | 0 |
| Red Fescue | | 11 | 17.9 | 0 |
| Sweetgum - LP | | 3.6 | 16 | 0 |
| Black Willow - LP | | 5.2 | 10.3 | 0 |
| Amaranth | PFOA | 45 | — | 0.1 |
| Horsetail | | 12.1 | — | 0.1 |
| Mustard | | 14.1 | — | 0 |
| River Birch - LP | | 45.8 | — | 0.2 |
| Sweetgum - LP | | 10.9 | 20.3 | 0 |
| Red Fescue | | 32.3 | 46.5 | 0.1 |
| Black Willow - LP | | 28.9 | 27.9 | 0 |
| Tulip Poplar - LP | | 11.5 | — | 0 |
| Sweetgum - LP | PFBS | 2.6 | 13.8 | 0 |
| Black Willow - LP | | 28.1 | 3.6 | 0 |
| Bermudagrass | | 14 | 16.5 | 0.1 |
| Red Fescue | | 57.2 | 64.9 | 0.1 |
| Sycamore - LP | | 15.2 | — | 0 |
| Tulip Poplar - LP | | 143.7 | — | 0 |
| Tall Fescue | | 39.6 | — | 0.2 |

— = Treatment Not Tested
LP = leaves and petioles

DISCUSSION

Our results establish Proof-of-Concept for phytoremediation of multiple PFAS compounds. *Festuca rubra* (Red Fescue) preformed the best overall at contaminant accumulation and achieved hyperaccumulation of all six PFAS compounds including PFOA, PFOS, and PFBS over the course of the study (as well as after 24 days from initial contaminant dosing when the first sampling event was completed on Apr. 1, 2018) in both the contaminant treatment and the contaminant+salinity treatment. The average red fescue BCF of the contaminant+salinity treatment showed greater accumulation than the treatment only for all six PFAS compounds. The final contaminant+salinity treatment samples had BCFs that ranged from approximately 17.9 (PFOS) to approximately 124.4 (PFPeA). The contaminant treatment had BCFs that ranged from approximately 11.0 (PFOS) to approximately 111.2 (PFPeA).

The large difference in PFAS accumulation between red fescue (*Festuca rubra*) compared to tall fescue (*Schedonorus arundinaceus*) is notable. However, there has been controversy regarding the naming and classification of the fescues (Casler, et al. 2008). The fine fescues, such as red fescue, are classified in the genus *Festuca*. The broadleaf fescues, such as tall fescue, were originally grouped into *Festuca*. As the science of plant classification developed and became more sophisticated, the broadleaf fescues were given their own genus: *Schedonorus* (Casler, et al. 2008). Hence, differences in accumulation of PFAS coincide with significant differences with the two plant species.

In addition to the red fescue, the leaves and petioles associated with the contaminant+salinity treatment for *Liquidambar styraciflua* (Sweetgum-LP) achieved hyperaccumulation of all six PFAS compounds. The contaminant+salinity treatment samples had BCFs that ranged from approximately 13.8 (PFBS) to approximately 33.7 (PFPeA). The woody samples showed negligible PFAS concentrations.

As a species, the black willow leaves and petioles achieved hyperaccumulation of all six PFAS compounds, but not within the same treatment. Black willow leaves and petioles achieved hyperaccumulation for the contaminant+salinity treatment for all but PFBS, whereas, they achieved hyperaccumulation for the contaminant only treatment for all but PFOS. The woody samples showed negligible PFAS concentrations.

River birch leaves and petioles showed hyperaccumulation for all but PFBS, but the BCF for PBFS was approximately 9.8. River birch leaves and petioles had the highest BCF for PFOA in study with a value of approximately 45.8. The woody samples showed negligible PFAS concentrations.

Like river birch, tulip poplar leaves and petioles showed hyperaccumulation for all but PFOS, but the BCF for PFOS was approximately 7.5. Tulip poplar leaves and petioles had the highest BCF for any of the tested PFAS compounds with a value of approximately 176.1 for PFPeA. The woody samples showed negligible PFAS concentrations.

Although *Amaranthus* did not achieve hyperaccumulation for PFBS or PFOS, it did hyperaccumulate the remaining four PFAS compounds and had one of the highest BCFs for PFOA (approximately 45.0).

Given *Festuca rubra* is shade tolerant and its growing seasons are spring and fall (i.e., cool season grass), its use with a successfully hyperaccumulating deciduous tree species is suited to work in tandem. This approach would involve a double-canopy system or a double cropping system. A double-canopy system entails management of two remedial crops, whereby the cool season red fescue grass grows during the fall and spring and a deciduous tree species (e.g., willow, sweetgum, river birch, tulip poplar) is grown to a degree of maturity. In this scenario the trees break winter dormancy and begin to leaf-out just as the growth of the red fescue crop peaks, is harvested, and then grass growth declines as summer temperatures increase, A double cropping system using red fescue and a deciduous tree species entails a somewhat more innovative approach. This approach uses elements of an intensive forest management technique of short or ultrashort rotation coppice (SRC). The SRC silviculture practice contemplated in this approach involves annual harvests using a system principally associated with maximizing woody biomass production as a bioenergy crop (Hauk, et al., 2014). Early development of short-rotation forest management techniques and systems were initially developed to a thorough degree in the 1970s when an energy crisis and pulp & paper demands necessitated innovations to meet national needs and industrial demands (Steinbeck, 1972; EPA, 1978). These management systems have been further refined since, and SRC has experienced renewed focus as concerns and costs associated with fossil fuel and climate change have intensified (Hauk, et al., 2014). With these systems both red fescue and the annual growth of managed saplings are both mechanically harvested, Ultrashort SRC, where hardwoods are harvested annually with power scythes, has been referred to as "wood grass"; it has been shown to be technologically and economically feasible (Kopp, et al., 1993). Hence, the use of cool season red fescue in combination with wood grass has merit. With such an approach red fescue would be harvested as the tree crop emerges from dormancy and the hardwood "wood grass" would be harvested in late summer or early autumn before leaf fall. With SRC, hardwoods regenerate each year from coppice and the need for replanting to replace mortality is manageable, even with annual harvests (e.g., <30% to 50% mortality after five successive annual harvests) (Kopp, et al., 1993). Vigorous regeneration from coppice stools can often persist beyond 30 years (Kopp, et al., 1993).

In this study, the growth media consisted of low ionic exchange screened sand with little organic matter, This growth media generated conditions where the PFAS compounds were more readily available for plant uptake than would be found in a typical field situation. However, the rationale supporting the use of a salinity treatment is that it should increase plant uptake of PFAS, which is supported by our results, because a saline solution, such as one containing divalent calcium and magnesium salts, creates greater ionic strength within the soil solution and helps displace PFAS compounds bound to soil exchange sites and organic matter. This increases the PFAS compounds in the soil solution, rendering them more available for plant uptake.

We note that our target soil salinity was approximately 4,000 µS/cm, which is the level that defines a saline soil condition. However, the saline-treated plants utilized are reportedly tolerant of this salinity level. The salinity level was raised incrementally during the study with regular doses of the saline treatment. The rate of increase in soil salinity levels was more gradual and slower than anticipated. During the study, soil conductivity measurements were made using a direct soil conductivity meter. At the time of the final plant sampling, the control and treatment soils had soil electrical conductivity levels of approximately 50 to approximately 100 µS/cm; the treatment+saline sods had an average conductivity of approximately 1,220 µS/cm. Thus, with further Increases in soil salinity greater increases in PFAS uptake by the plants may occur than achieved in this study.

The screened and washed sand used as the growth media in our study was low in organic matter; although, the grasses and legumes that were used in the study were first propagated from seed in shadow trays of potting soil which contributed some organic matter content when these plants were transplanted into the columns. Nevertheless, the plants were grown in a relatively low organic matter medium. We understand the plants uptake PFAS with uptake of soil-water. If impacted sites are managed such that organic matter and soluble carbon are reduced, then a concomitant increase in uptake rates of PFAS by plants will occur. Site management that includes elements of tillage and application of synthetic inorganic nitrogen fertilizer are strategies to lower soil carbon levels and increase PFAS phytoextraction. When combined with salinity treatments, some of the negative effects of reduced soil organic matter, particularly in loamy or clayey soils, can be lessened by the beneficial flocculating effect of the divalent cations calcium and magnesium.

The higher concentrations of PFAS in the forage grass is also understood to be partially related to the protein content in the plant tissue, as some researchers exploring PFAS prevalence in agricultural crops have found higher PFAS concentrations correlating positively with higher protein contents. Harvesting younger growth on a more frequent harvest schedule, like that which drives greater nitrogen assimilation on nitrogen-limiting land treatment sites, is a strategy applicable to driving increased PFAS assimilation within a phytoremediation context.

*Festuca* species are cool season grasses that are best planted in the autumn and harvested in spring, before deciduous trees fully leaf out. *Festuca* can be propagated from seed and yields can typically meet amounts of approximately 3 tons per acre or more. With ultrashort SRC systems yields can average approximately 10 oven-dry tons per hectare per year (o.d. t $ha^{-1}y^{-1}$) with fertilization. For example, one study reported production capacities of various willow tree species ranged from approximately 8.0 to approximately 15.5 o.d. t $ha^{-1}yr^{-1}$ over a multiyear study (Kopp, et al., 1993). At such rates of agronomic/forest production, along with the ability to mechanically cultivate and harvest, the viability of phytoextraction of PFAS from contaminated soil and sediment is practical and a "greener cleanup" technology in that it meets core elements outlined in the American Society of Testing Materials (ASTM) E2893 Standard Guide for Greener Cleanups that include minimizing greenhouse gas emissions, air pollutants, use of materials, generation of waste, disturbance to land and ecosystems, and noise and light disturbance. This is particularly the case on sites where PFAS concentrations are at moderate to lower levels and where the size of the impacted area is large (>1 acre).

As an example, a cubic foot of soil that is similar to the tested growth media and having concentrations of approximately 110 ug/Kg (ppb) of PFOS and PFOA that undergoes phytoremediation with red fescue and utilizing salinity enhancement, it is estimated it would take approximately 10 years and approximately 3.5 years to reduce the concentrations of PEGS and PFOA by approximately 50%, respectively. However, if red fescue is utilized in tandem in a double cropping system, this time frame could potentially be reduced by approximately 30%.

Overall, our results demonstrate the feasibility of remediating PFAS contaminated sites. We seek to protect our viable intellectual property via patent protections.

REFERENCES

Blaine, A. C., C. D. Rich, E. Sedlacko, K. C. Hyland, C. Stushnoff, E. R. V. Dickerson and C. P. Higgins. 2014. Perfluoroalkyl Acid Uptake in Lettuce (*Lactuca sativa*) and Strawberry 2 (*Fragaria ananassa*) Irrigated with Reclaimed Water. Environ. Sci. Tech. dx.doi.org/10.1021/es504150h|Environ. Sci. Technol. 2014 Dec. 16; 48(24): 14361-8. doi: 10.1021/es504150h. Epub 2014 Nov. 25.

Casler, M., K. Albrecht, J. Lehmkuhler, G. Brink, and D. Combs. 2008. Forage Fescues in the Northern USA. University of Wisconsin-Madison Center for Integrated Agricultural Systems. 15pp.

Environmental Protection Agency (EPA), 1978. Preliminary Environmental Assessment of Biomass Conversion to Synthetic Fuels. EPA-600/7-78-204.

EPA, 2017a. Small Business Innovative Research (SBIR) Program Grant Solicitation SOL-NC-17-00028SBIR. https://www.epa.gov/sbir/sbir-funding-opportunities EPA, 2017b. Technical Fact Sheet—Perfluorooctane Sulfonate (PFOS) and Perfluorooctanoic Acid (PFOA) November 2017. https://www.epa.gov/sites/production/files/2017-12/documents/ffrrofactsheet_contaminants_p-fos_pfoa_11-20-17_508_0.pdf EPA, 2019. EPA's Per- and Polyfluoroalkyl Substances (PFAS) Action Plan. https://www.epa.gov/sites/production/files/2019-02/documents/pfas_action_plan_021319_508compliant_1.pdf. EPA 823R18004

Ghisi, R. T. Vamerali and S. Manzetti. 2018. Accumulation of perfluorinated alkyl substances (PFAS) in agricultural plants: A review. Environ. Res. 169: 326-341.

Hauk, S., T. Knoke, and S. Wittkopf. 2014. Economic evaluation of short rotation coppice systems for energy form biomass—A review. Renewable and Sustainable Energy Reviews 29 (2014) 435-448.

Kopp, R. F., E. H. White, L. P. Abrahamson, C. A. Nowak, L. Zsuffa, K., and A. F. Burns, 1993. Willow Biomass Trials in Central New York State. Biomas and Bioenergy Vol. 5, No. 2, pp. 179-187.

McCutcheon, S. C. and J. L. Schnoor, 2003. Phytoremediation: Transformation and Control of Contaminants. John Wiley & Sons, Inc. Hoboken, N.J.

Navarro, I. A. de la Torre, P. Sanz, M. Á. Porcel, J. Pro, G. Carbonell, M. de los Ángeles Martínez 2017. Uptake of perfluoroalkyl substances and halogenated flame retardants by crop plants grown in biosolids-amended soils. Environ. Res. 152: 199-206.

Steinbeck, K. R. G. McAlpine, and J. T. May, 1972. Short rotation culture of Sycamore: a status report. Journal of Forestry 70:210-213.

Zhao, H., Y. Guan, G. Zhang, Z. Zhang, F. Tan, X. Quan and J. Chen. 2013. Uptake of perfluorooctane sulfonate (PFOS) by wheat (*Triticum aestivum* L) plant. Chemosphere 91: 139-144.

Zhang, W. D. Zhang, D. Zagorevski and Y. Ling. 2019. Exposure of Juncus effusus to seven perfluoroalkyl acids: uptake, accumulation and phytotoxicity. Chemosphere 233: 300-308.

The term "approximately"/"approximate" can be +/-10% of the amount referenced. Additionally, preferred amounts and ranges can include the amounts and ranges referenced without the prefix of being approximately.

Although specific advantages have been enumerated above, various embodiments may include some, none, or all of the enumerated advantages.

Modifications, additions, or omissions may be made to the systems, apparatuses, and methods described herein without departing from the scope of the disclosure. For example, the components of the systems and apparatuses may be inteared or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method for increasing the amount of per- and polyfluoroalkyl substances (PFAS) that a plant will accumulate from PFAS contaminated media soil, sediment, and groundwater, comprising the steps of:
    growing live selected plants in per- and polyfluoroalkyl substances (PFAS) contaminated media soil, sediments, or groundwater; and
    providing for phytoremediation via phytoextraction of the per- and polyfluoroalkyl substances (PFAS) from the contaminated media, soil, sediment, and groundwater, wherein the providing step further includes
    managing soil salinity levels to increase ionic strength and salinity of the contaminated media soil, sediments and ground water with $CaSO_4 \cdot 2H_2O$ and $MgSO_4 \cdot 2H_2O$ to have a salinity of approximately 1,220 µS/cm or approximately 4,000 µS/cm.

2. The method of claim 1, further comprising the step of manipulating amounts of organic matter in the contaminated sites by
    reducing the amounts of organic matter and soluble carbon levels in the contaminated sites.

3. The method of claim 2, wherein the step of reducing the amounts of the organic matter and soluble carbon levels in the contaminated sites, includes the steps of at least one of:
    tilling the contaminated soil; and
    adding inorganic nitrogen to the contaminated soil.

4. The method of claim 1, wherein the per- and polyfluoroalkyl substances (PFAS) include the compounds perfluorooctanoic acid (PFOA), perfluorooctane sulfonate (PFOS), and perfluorobutane sulfonic acid (PFBS).

5. The method of claim 1, wherein the per- and polyfluoroalkyl substances (PFAS) include the compounds perfluorooctanoic acid (PFOA), perfluorooctane sulfonate (PFOS), perfluorobutane sulfonic acid (PFBS), tridecafluorohexane-1-sulfonic acid potassium salt (PFHxS), perfluoropentanoic acid (PFPeA), and undecafluorohexanoic acid (PFHxA).

6. The method of claim 1, wherein the contaminated site is selected from at least one of:
    PFAS contaminated soil, PFAS contaminated sediment, and PFAS contaminated groundwater.

7. A method for increasing the amount of per- and polyfluoroalkyl substances (PFAS) that a plant will accumulate from PFAS contaminated media soil, sediment, and groundwater, comprising the steps of:
    growing live selected plants in per- and polyfluoroalkyl substances (PFAS) contaminated media soil, sediments, or groundwater; and
    providing for phytoremediation via phytoextraction of the per- and polyfluoroalkyl substances (PFAS) from the contaminated media, soil, sediment, and groundwater, wherein the live selected plant is selected from any one of:
    *Amaranthus tricolor, Betula nigra, Brassica juncea, Cynodon dactylon, Esquisetum hyemale, Schedonorus arundinaceus, Festuca rubra* (Red Fescue) and its subspecies, *Helianthus annuus, Liquidambar styraciflua, Liriodendron tulipifera, Trifolium incarnatum, Platanus occidentalis,* and *Salix nigra.*

8. A method for increasing the amount of per- and polyfluoroalkyl substances (PFAS) that a plant will accumulate from PFAS contaminated media soil, sediment, and groundwater, comprising the steps of:
    growing live selected plants in per- and polyfluoroalkyl substances (PFAS) contaminated media soil, sediments, or groundwater; and
    providing for phytoremediation via phytoextraction of the per- and polyfluoroalkyl substances (PFAS) from the contaminated media, soil, sediment, and groundwater, wherein the live selected plant is *Festuca rubra* (Red Fescue) and its subspecies.

9. The method of claim 8, wherein the per- and polyfluoroalkyl substances (PFAS) include the compounds perfluorooctanoic acid (PFOA), perfluorooctane sulfonate (PFOS), perfluorobutane sulfonic acid (PFBS), tridecafluorohexane-1-sulfonic acid potassium salt (PFHxS), perfluoropentanoic acid (PFPeA), and undecafluorohexanoic acid (PFHxA).

10. A method for increasing the amount of per- and polyfluoroalkyl substances (PFAS) that a plant will accumulate from PFAS contaminated media soil, sediment, and groundwater, comprising the steps of:

growing live selected plants in per- and polyfluoroalkyl substances (PFAS) contaminated media soil, sediments, or groundwater; and providing for phytoremediation via phytoextraction of the per- and polyfluoroalkyl substances (PFAS) from the contaminated media, soil, sediment, and groundwater, wherein the live selected plant is *Liquidambar styraciflua* (Sweetgum-LP).

11. The method of claim 10, wherein the per- and polyfluoroalkyl substances (PFAS) include the compounds perfluorooctanoic acid (PFOA), perfluorooctane sulfonate (PFOS), perfluorobutane sulfonic acid (PFBS), tridecafluorohexane-1-sulfonic acid potassium salt (PFHxS), perfluoropentanoic acid (PFPeA), and undecafluorohexanoic acid (PFHxA).

12. A method for increasing the amount of per- and polyfluoroalkyl substances (PFAS) that a plant will accumulate from PFAS contaminated media soil, sediment, and groundwater, comprising the steps of:

growing live selected plants in per- and polyfluoroalkyl substances (PFAS) contaminated media soil, sediments, or groundwater; and providing for phytoremediation via phytoextraction of the per- and polyfluoroalkyl substances (PFAS) from the contaminated media, soil, sediment, and groundwater, wherein the live selected plant is *Salix nigra* (Black willow-LP) leaves and petioles.

13. The method of claim 12, wherein the per- and polyfluoroalkyl substances (PFAS) include the compounds perfluorooctanoic acid (PFOA), perfluorooctane sulfonate (PFOS), perfluorobutane sulfonic acid (PFBS), tridecafluorohexane-1-sulfonic acid potassium salt (PFHxS), perfluoropentanoic acid (PFPeA), and undecafluorohexanoic acid (PFHxA).

14. A process for hyperaccumulating multiple per- and polyfluoroalkyl substances PFAS compounds, comprising the steps of:

growing live selected plants in per- and polyfluoroalkyl substances (PFAS) contaminated media soil, sediments, or groundwater, the live plants selected from:

*Amaranthus tricolor, Betula nigra, Brassica juncea, Cynodon dactylon, Esquisetum hyemale, Schedonorus arundinaceus, Festuca rubra* (and its subspecies), *Helianthus annuus, Liquidambar styraciflua, Liriodendron tulipifera, Trifolium incamatum, Platanus occidentalis,* and *Salix nigra*; and phytoremediating via phytoextraction of the per- and polyfluoroalkyl substances (PFAS) from the contaminated media, soil, sediment, and groundwater, the PFAS contaminants including the compounds perfluorooctanoic acid (PFOA), perfluorooctane sulfonate (PFOS), and perfluorobutane sulfonic acid (PFBS).

15. A process for hyperaccumulating multiple per- and polyfluoroalkyl substances PFAS compounds, comprising the steps of:

growing live selected plants in per- and polyfluoroalkyl substances (PFAS) contaminated media soil, sediments, or groundwater, the live plants selected from *Amaranthus tricolor, Betula nigra, Brassica juncea, Cynodon dactylon, Esquisetum hyemale, Schedonorus arundinaceus, Festuca rubra* (and its subspecies), *Helianthus annuus, Liquidambar styraciflua, Liriodendron tulipifera, Trifolium incarnatum,* and *Platanus occidentalis,* and *Salix nigra*; and phytoremediating via phytoextraction of the per- and polyfluoroalkyl substances (PFAS) from the contaminated media, soil, sediment, and groundwater, the PFAS contaminants including the compounds perfluorooctanoic acid (PFOA), perfluorooctane sulfonate (PFOS), perfluorobutane sulfonic acid (PFBS), tridecafluorohexane-1-sulfonic acid potassium salt (PFHxS), perfluoropentanoic acid (PFPeA), and undecafluorohexanoic acid (PFHxA).

\* \* \* \* \*